(12) United States Patent
Han et al.

(10) Patent No.: US 11,121,953 B2
(45) Date of Patent: *Sep. 14, 2021

(54) ACCESS POINT PERFORMANCE MONITORING AND ANOMALY DETECTION BASED ON TEMPORAL AND SPATIAL ANOMALIES

(71) Applicant: ARRIS Enterprises LLC, Suwanee, GA (US)

(72) Inventors: Yang Han, Singapore (SG); SeeHo Ting, Singapore (SG); Koteswar Rao Mellachervu, San Jose, CA (US); Lakshmi Nagarajan, Singapore (SG); Ilango Purushothaman, Fremont, CA (US); Jiayi Chen, Vancouver (CA)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/897,434

(22) Filed: Jun. 10, 2020

(65) Prior Publication Data

US 2020/0396147 A1 Dec. 17, 2020

Related U.S. Application Data

(60) Provisional application No. 62/859,934, filed on Jun. 11, 2019.

(51) Int. Cl.
*G06F 15/173* (2006.01)
*H04L 12/26* (2006.01)
(Continued)

(52) U.S. Cl.
CPC ...... *H04L 43/0817* (2013.01); *H04L 41/0654* (2013.01); *H04L 43/06* (2013.01);
(Continued)

(58) Field of Classification Search
CPC . H04L 43/0817; H04L 41/0654; H04L 43/06; H04L 43/0888; H04L 43/106;
(Continued)

(56) References Cited

U.S. PATENT DOCUMENTS

| 7,933,628 | B2 | 4/2011 | Kish et al. |
| 8,385,943 | B1 | 2/2013 | Han et al. |

(Continued)

FOREIGN PATENT DOCUMENTS

EP 3110198 A2 12/2016

OTHER PUBLICATIONS

International Search Report and the Written Opinion of the International Searching Authority corresponding to International Patent Application No. PCT/US2020/036897 (12 pages) dated Sep. 24, 2020).

*Primary Examiner* — Johnny B Aguiar
(74) *Attorney, Agent, or Firm* — Steven Stupp; Stewart Wiener

(57) ABSTRACT

During operation, a computer may compare values of at least one performance metric for access points in appropriate contexts to determine one or more temporal anomalies and/or one or more spatial anomalies for one or more of the access points. Then, the computer may generate one or more temporal anomaly events based at least in part on the one or more temporal anomalies and one or more spatial anomaly events based at least in part on the one or more spatial anomalies. Next, the computer may calculate one or more complex events based at least in part on two or more of the different anomalies. Moreover, the computer may evaluate the different anomalies, anomaly event and/or complex events to determine one or more insights about a problem in the network. Furthermore, the computer may perform a remedial action.

20 Claims, 19 Drawing Sheets

(51) Int. Cl.
*H04L 12/24* (2006.01)
*H04L 29/06* (2006.01)

(52) U.S. Cl.
CPC ........ *H04L 43/0888* (2013.01); *H04L 43/106* (2013.01); *H04L 43/16* (2013.01); *H04L 63/1425* (2013.01)

(58) Field of Classification Search
CPC ..... H04L 43/16; H04L 63/1425; H04L 43/08; H04L 41/0622; H04L 41/0618; H04W 24/04
USPC .................................................. 709/223, 224
See application file for complete search history.

(56) References Cited

U.S. PATENT DOCUMENTS

| | | |
|---|---|---|
| 8,547,899 B2 | 10/2013 | Kish |
| 8,670,725 B2 | 3/2014 | Kish |
| 9,661,070 B2 | 5/2017 | Day et al. |
| 9,877,295 B2 | 1/2018 | Han et al. |
| 9,998,852 B2 | 6/2018 | Kish et al. |
| 10,200,901 B2 | 2/2019 | Chen et al. |
| 2014/0099978 A1 | 4/2014 | Egner et al. |
| 2014/0283062 A1* | 9/2014 | Kamthe ............ H04W 12/1205 726/23 |
| 2015/0382215 A1* | 12/2015 | Huang ................. H04W 24/08 370/252 |
| 2016/0205596 A1 | 7/2016 | Yao et al. |
| 2016/0285700 A1 | 9/2016 | Gopalakrishnan et al. |
| 2016/0359592 A1* | 12/2016 | Kulshreshtha ........ G06F 16/288 |
| 2016/0373306 A1* | 12/2016 | Saha ...................... H04L 41/06 |
| 2017/0127303 A1 | 5/2017 | Austin et al. |
| 2017/0310546 A1* | 10/2017 | Nair .................... H04L 41/0654 |
| 2017/0336494 A1 | 11/2017 | Han |
| 2018/0220314 A1 | 8/2018 | Chen et al. |
| 2019/0007919 A1 | 1/2019 | Petrus et al. |
| 2019/0150074 A1 | 5/2019 | Narayanan et al. |
| 2020/0267057 A1* | 8/2020 | Garvey .............. H04L 41/0816 |

\* cited by examiner

ACCESS POINT PERFORMANCE MONITORING AND ANOMALY DETECTION BASED ON TEMPORAL AND SPATIAL ANOMALIES

CROSS-REFERENCE TO RELATED APPLICATION

This application claims priority under 35 U.S.C. 119(e) to: U.S. Provisional Application Ser. No. 62/859,934, "Network Performance Monitoring and Anomaly Detection," filed on Jun. 11, 2019, by Yang Han et al., the contents of which are herein incorporated by reference.

BACKGROUND

Field

The described embodiments relate to techniques for communicating information among electronic devices. In particular, the described embodiments relate to techniques for detecting anomalies based at least in part on access-point performance indicators, identifying impacts and causes of the detected anomalies, and/or providing summary information or recommendations.

Related Art

Many electronic devices are capable of wirelessly communicating with other electronic devices. In particular, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth from the Bluetooth Special Interest Group of Kirkland, Wash.), and/or another type of wireless network.

For example, many electronic devices communicate with each other via wireless local area networks (WLANs) using an IEEE 802.11-compatible communication protocol (which are sometimes collectively referred to as 'Wi-Fi'). In a typical deployment, a Wi-Fi-based WLAN includes one or more access points (or basic service sets or BSSs) that communicate wirelessly with each other and with other electronic devices using Wi-Fi, and that provide access to another network (such as the Internet) via IEEE 802.3 (which is sometimes referred to as 'Ethernet').

Wi-Fi has emerged as one of the cornerstone technologies of the mobile Internet, and the scale of Wi-Fi networks continues to increase. In the near future, carrier-class Wi-Fi networks are expected to contain several hundred thousand access points.

While large-scale Wi-Fi networks are popular because of their reduced cost, and increased coverage, and capacity, managing and maintaining such large networks can be challenging. One approach for addressing this challenge is anomaly detection, which refers to techniques of finding pattern-breaking data points that deviate from or do not conform with their expected values. As in other complex systems, anomalous samples of a given key performance indicators for access points (such as received signal strength, client counts, session length, traffic, etc.) in a Wi-Fi network can indicate significant functional issues of the network.

However, anomaly detection techniques are usually plagued by false positives or false alarms. For example, given the dynamic and ad-hoc nature of Wi-Fi networks, many anomaly detection techniques cannot accurately detect anomalies. Moreover, given the size of carrier-class Wi-Fi networks, it can be difficult to accurately detect anomalies in a timely manner. The incorrect anomaly detections and/or anomaly detection delays can result in significant expense and reduced communication performance in large Wi-Fi networks, which can be frustrating to operators and can degrade the user experience of users of these networks.

SUMMARY

The described embodiments relate to a computer that includes an interface circuit that communicates with access points in a network. During operation, the computer monitors values of at least one performance metric associated with packet communication by the access points. Then, the computer compares the values of at least the one performance metric for the access points in multiple temporal contexts with historical values of at least the one performance metric in order to determine one or more temporal anomalies for one or more of the access points. Moreover, the computer compares the values of at least the one performance metric for the access points having a spatial context in order to determine one or more spatial anomalies for one or more of the access points. Next, the computer generates one or more temporal anomaly events based at least in part on the one or more temporal anomalies, and generates one or more spatial anomaly events based at least in part on the one or more spatial anomalies. Furthermore, the computer calculates one or more complex events based at least in part on two or more of the one or more temporal anomalies and the one or more spatial anomalies. Additionally, the computer evaluates the one or more temporal anomaly events, the one or more spatial anomaly events, and the one or more complex events to determine one or more insights about a problem in the network, and performs a remedial action associated with the problem based at least in part on the one or more insights.

Note that the spatial context may include the access points having an environment with one or more common attributes.

Moreover, the multiple temporal contexts may include one or more instances of a first time interval, a second time interval and a third time interval, where the second time interval includes the first time interval and the third time interval includes the second time interval. In some embodiments, the one or more temporal anomalies corresponding to the multiple temporal contexts are determined using different thresholds.

Furthermore, the computer may determine the one or more temporal anomalies and the one or more spatial anomalies concurrently.

Additionally, the one or more temporal anomalies may be based at least in part on a temporal anomaly direction.

In some embodiments, when at least the one performance metric corresponds to a ratio, the computer may compute adjusted values of at least the one performance metric based at least in part on the values of at least the one performance metric and the historical values of at least the one performance metric, and the one or more temporal anomalies or the one or more spatial anomalies may be determined using the adjusted values instead of the values.

Moreover, the one or more temporal anomaly events may correspond to one or more temporal clusters of the one or more temporal anomalies, and the one or more spatial anomaly events may correspond to one or more spatial clusters of the one or more spatial anomalies.

Furthermore, the one or more temporal anomalies may be based at least in part on median absolute deviations of the values.

Additionally, the one or more temporal anomaly events may be generated based at least in part on superpositions of instances of a kernel function at the one or more temporal anomalies and a threshold.

Note that the one or more insights may include or correspond to one or more of: analysis in a time window; analysis of different potential problems in the network; or identification of the problem.

Moreover, the remedial action may include: a recommendation about the problem, a notification about the problem, a report with computed results associated with the problem, or a corrective action in the network associated with the problem. In some embodiments, the corrective action includes: updating firmware, rebooting or providing another type of feedback to at least one of the access points.

Another embodiment provides a readable storage medium for use with the computer. When executed by the computer, this readable storage medium includes causes the computer to perform at least some of the aforementioned operations.

Another embodiment provides a method, which may be performed by the computer. This method includes at least some of the aforementioned operations.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

A computer that performs a remedial action is described. During operation, this computer may monitor values of at least one performance metric associated with packet communication by access points in a network. Then, the computer may compare values of at least one performance metric for access points in multiple temporal contexts and/or a spatial context to determine one or more temporal anomalies and/or one or more spatial anomalies for one or more of the access points. Next, the computer may generate one or more temporal anomaly events based at least in part on the one or more temporal anomalies and one or more spatial anomaly events based at least in part on the one or more spatial anomalies. Moreover, the computer may calculate one or more complex events based at least in part on two or more of the different anomalies. Furthermore, the computer may evaluate the different anomalies, anomaly event and/or complex events to determine one or more insights about a problem in the network. Additionally, the computer may perform a remedial action associated with the problem based at least in part on the one or more insights.

By evaluating the values of at least the one performance metric in the temporal and spatial contexts, this detection technique may accurately identify anomalies that cannot be explained by normal system dynamics (i.e., with a reduced or eliminated false-positive or false-alert rate). Therefore, the detection technique may enable operators or users of the network to perform the appropriate remedial action in a timely manner. This may improve the communication performance of the network, while reducing the cost of maintaining the network. Consequently, the detection technique may improve the user experience of the operators and users of the networks.

In the discussion that follows, electronic devices and the access points communicate frames or packets in accordance with a wireless communication protocol, such as an Institute of Electrical and Electronics Engineers (IEEE) 802.11 standard (which is sometimes referred to as 'Wi-Fi', from the Wi-Fi Alliance of Austin, Tex.), Bluetooth (from the Bluetooth Special Interest Group of Kirkland, Wash.), and/or another type of wireless interface. In the discussion that follows, Wi-Fi is used as an illustrative example. However, a wide variety of communication protocols (such as Long Term Evolution or LTE, another cellular-telephone communication protocol, etc.) may be used.

Moreover, the access point may communicate with other access points and/or computers in the network using a wired communication protocol, such as an IEEE 802.3 standard (which is sometimes referred to as 'Ethernet') and/or another type of wired interface. In the discussion that follows, Ethernet is used as an illustrative example.

Figure 1:
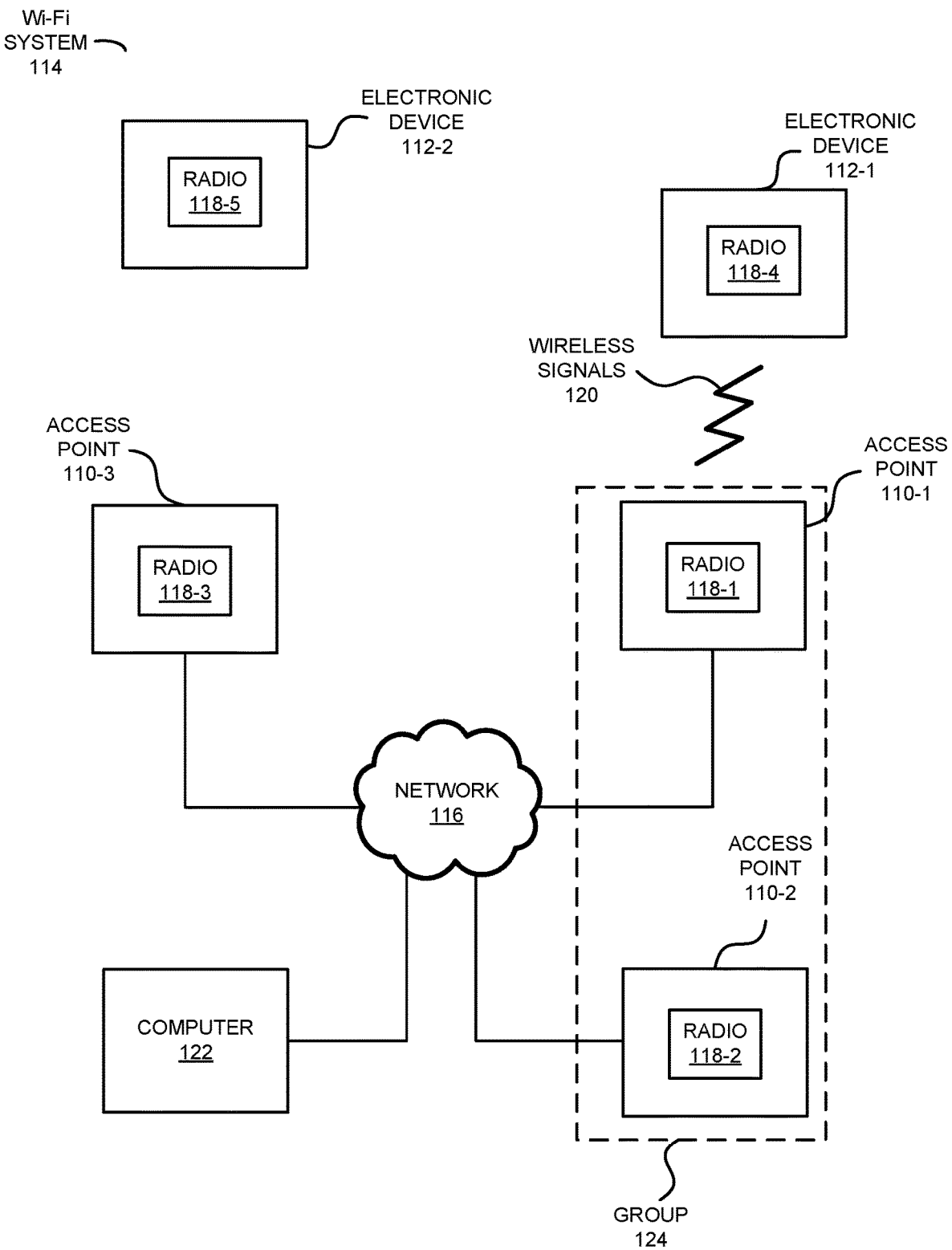
FIG. 1 is a block diagram illustrating an example of communication among access points and electronic devices in a network in accordance with an embodiment of the present disclosure.

FIG. 1 presents a block diagram illustrating an example of communication among one or more access points 110 and electronic devices 112 (such as a cellular telephone) in a large-scale Wi-Fi system 114 in accordance with some embodiments. In particular, access points 110 may communicate with each other using wireless and/or wired communication. Note that access points 110 may include a physical access point and/or a virtual access point that is implemented in software in an environment of an electronic device or a computer. In addition, at least some of access points 110 may communicate with electronic devices 112 using wireless communication.

The wired communication in Wi-Fi system 114 may occur via network 116 (such as an intra-net, a mesh network, point-to-point connections and/or the Internet) and may use a network communication protocol, such as Ethernet. Moreover, the wireless communication using Wi-Fi may involve: transmitting advertising frames on wireless channels, detecting one another by scanning wireless channels, establishing connections (for example, by transmitting association or attach requests), and/or transmitting and receiving packets (which may include the association requests and/or additional information as payloads). In some embodiments, the wireless communication among access points 110 also involves the use of dedicated connections, such as via a peer-to-peer (P2P) communication technique.

Figure 21:
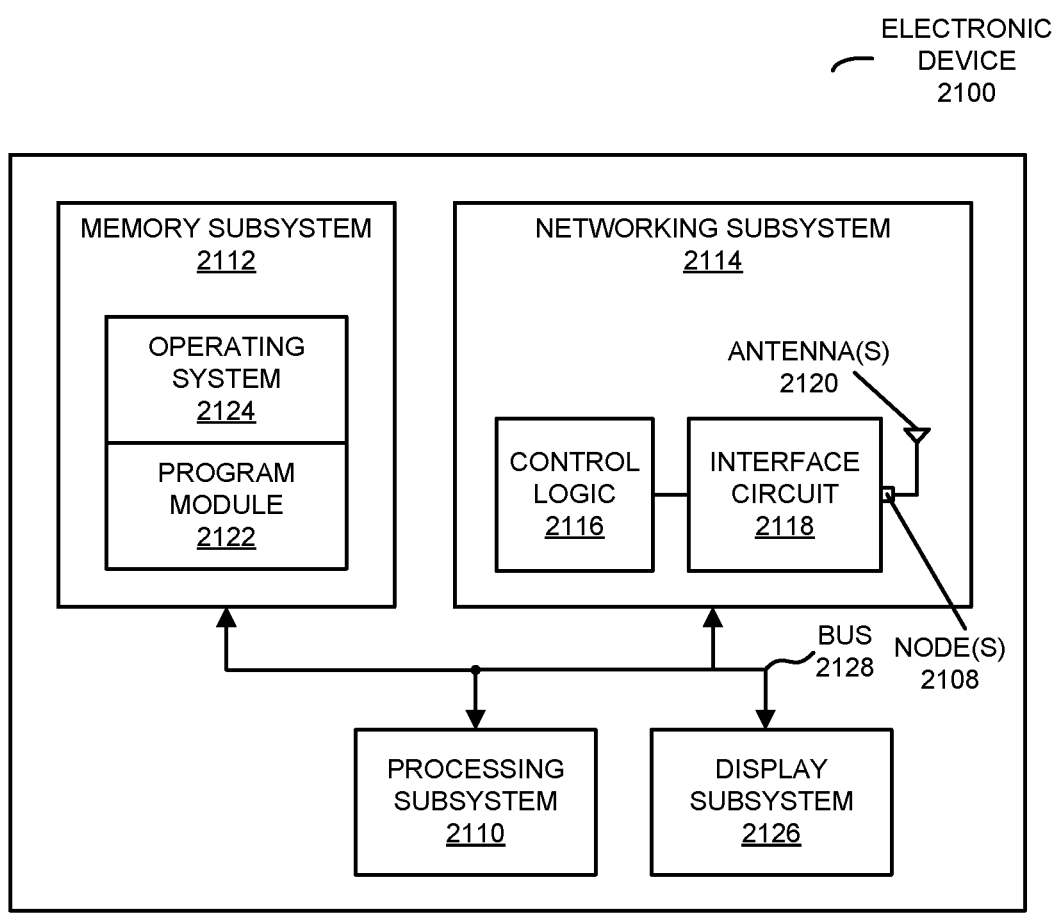
FIG. 21 is a block diagram illustrating an electronic device in accordance with an embodiment of the present disclosure.

As described further below with reference to FIG. 21, access points 110 and/or electronic devices 112 may include subsystems, such as a networking subsystem, a memory subsystem and a processor subsystem. In addition, access points 110 and electronic devices 112 may include radios 118 in the networking subsystems. More generally, access points 110 and electronic devices 112 can include (or can be included within) any electronic devices with the networking subsystems that enable access points 110 and electronic devices 112 to communicate with each other using wireless and/or wired communication. This wireless communication can comprise transmitting advertisements on wireless channels to enable access points 110 and/or electronic devices 112 to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 118 are shown in access points 110 and electronic devices 112, one or more of these instances may be different from the other instances of radios 118.

As can be seen in FIG. 1, wireless signals 120 (represented by a jagged line) are transmitted from radio 118-1 in access point 110-1. These wireless signals may be received by radio 118-4 in electronic device 112-1. In particular, access point 110-1 may transmit packets. In turn, these packets may be received by electronic device 112-1.

Note that the communication among access points 110 and/or with electronic devices 112 may be characterized by a variety of performance metrics, such as: a received signal strength (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

In the described embodiments processing a packet or frame in access points 110 and electronic devices 112 includes: receiving wireless signals 120 with the packet or frame; decoding/extracting the packet or frame from received wireless signals 120 to acquire the packet or frame; and processing the packet or frame to determine information contained in the packet or frame.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As noted previously, it can be expensive and complicated to detect anomalies in Wi-Fi system 114. As described further below with reference to FIGS. 2-20, a local or a remotely located computer 122 (which may be separate from or may be included in a controller associated with access points 110) may implement the detection technique. In particular, computer 122 may, via network 116, monitor values of at least one performance metric associated with communication by access points 110, such as communication of frames or packets (which is sometimes referred to as 'packet communication'). Note that the performance metric may include: an RSSI, a throughput, and/or a packet error rate. In some embodiments, the performance metric is based at least in part on a set of measurements and a statistical analysis technique, such as: a median, a mean, a histogram and/or a kernel-based statistical analysis technique.

Then, computer 122 may compare current values of the performance metric for access points 110 in multiple temporal contexts with historical values of the performance metric for access points 110 in order to determine one or more temporal anomalies for one or more of access points 110. For example, the multiple temporal contexts may include one or more instances of different time intervals, such as a first time interval, a second time interval and a third time interval. The second time interval may include the first time interval and the third time interval may include the second time interval. Moreover, the one or more temporal anomalies may be based at least in part on median absolute deviations of the values.

In some embodiments, the one or more temporal anomalies corresponding to the multiple temporal contexts are determined using different thresholds. Note that the one or more temporal anomalies may be based at least in part on a temporal anomaly direction (such as high or low relative to a historical baseline).

Moreover, computer 122 may compare the values of the performance metric for access points 110 having a spatial context in order to determine one or more spatial anomalies for one or more of the access points. For example, the one or more spatial anomalies may be determined by comparing concurrent values of the performance metric for access points 110 having the spatial context. Note that the spatial context may include access points 110 having an environment with one or more common attributes, such as a common characteristic, a common radio-frequency environment, are geographically proximate to each other, have approximately the same response to a change in an environmental factor, etc. In some embodiments, computer 122 may determine the one or more temporal anomalies and the one or more spatial anomalies concurrently (e.g., in parallel).

Next, computer 122 may generate one or more temporal anomaly events based at least in part on the one or more temporal anomalies, and may generate one or more spatial anomaly events based at least in part on the one or more spatial anomalies. For example, the one or more temporal anomaly events may correspond to one or more temporal clusters of the one or more temporal anomalies, and the one or more spatial anomaly events may correspond to one or more spatial clusters of the one or more spatial anomalies. In some embodiments, the one or more temporal anomaly events may be generated based at least in part on superpositions of instances of a kernel function at the one or more temporal anomalies and a threshold.

Moreover, computer 122 may calculate one or more complex events based at least in part on two or more of the one or more temporal anomalies and the one or more spatial anomalies.

Furthermore, computer 122 may evaluate the one or more temporal anomaly events, the one or more spatial anomaly events, and/or the one or more complex events to determine one or more insights about a problem in Wi-Fi system 114, and may perform a remedial action associated with the problem based at least in part on the one or more insights. For example, the one or more insights may include or correspond to one or more of: analysis in a time window; analysis of different potential problems in Wi-Fi system 114; and/or or identification of the problem. Additionally, the remedial action may include: a recommendation about the problem (such as providing the recommendation to an operator or a user), a notification about the problem (such as displaying the notification to the operator or the user), a report with computed results associated with the problem, or a corrective action in Wi-Fi system 114 associated with the problem. In some embodiments, the corrective action may include: updating firmware, rebooting or providing another type of feedback (such as scheduling maintenance or replacement) to at least one of access points 110 (such as access point 110-1).

In this way, computer 122 may accurately identify anomalies in Wi-Fi system 114, and may enable the remedial action, thereby reducing maintenance costs and improving the communication performance in Wi-Fi system 114.

Figure 2:
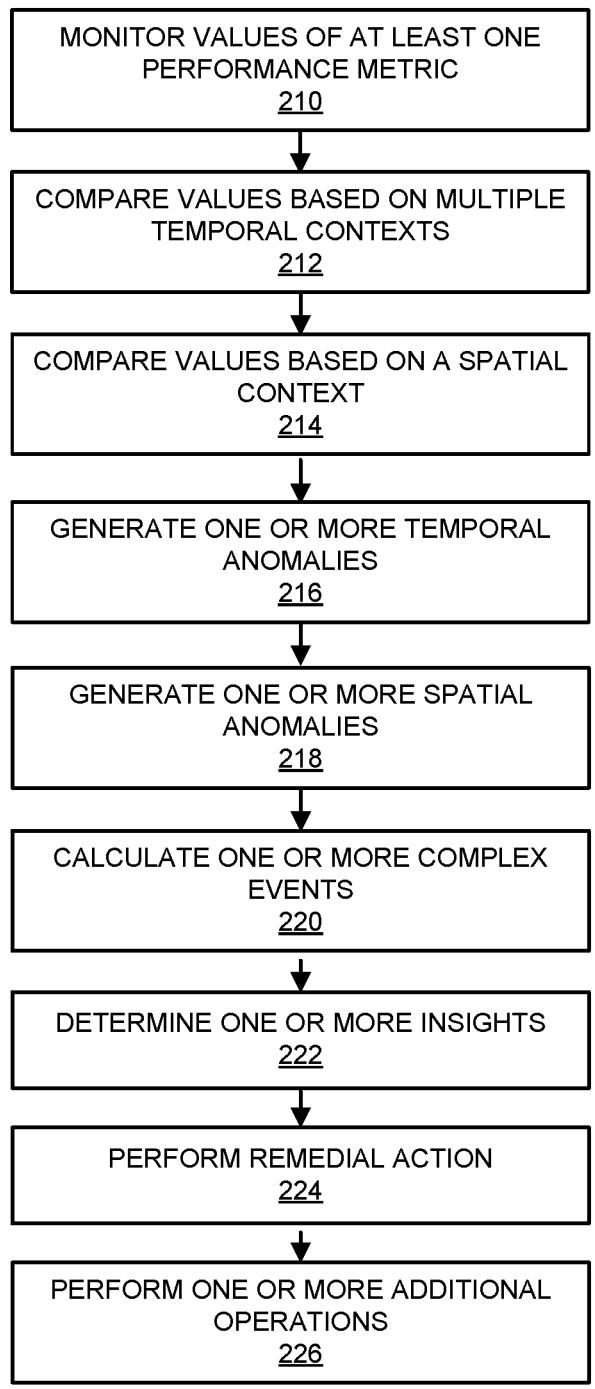
FIG. 2 is a flow diagram illustrating an example of a method for performing a remedial action using a computer in FIG. 1 in accordance with an embodiment of the present disclosure.

We now describe embodiments of the method. FIG. 2 presents a flow diagram illustrating an example of a method 200 for performing a remedial action using a computer, such as computer 122 in FIG. 1. During operation, the computer may monitor values of at least one performance metric (operation 210) associated with packet communication by the access points.

Then, the computer may compare the values (operation 212) of at least the one performance metric for the access points in multiple temporal contexts with historical values of at least the one performance metric in order to determine one or more temporal anomalies for one or more of the access points. Moreover, the multiple temporal contexts may include one or more instances of a first time interval, a second time interval and a third time interval, where the second time interval includes the first time interval and the third time interval includes the second time interval. Furthermore, the one or more temporal anomalies corresponding to the multiple temporal contexts are determined using different thresholds. Note that the one or more temporal anomalies may be based at least in part on a temporal anomaly direction. In some embodiments, the one or more temporal anomalies may be based at least in part on median absolute deviations of the values.

Moreover, the computer may compare the values (operation 214) of at least the one performance metric for the access points having a spatial context in order to determine one or more spatial anomalies for one or more of the access points. Note that the spatial context may include the access points having an environment with one or more common attributes. In some embodiments, the computer may determine the one or more temporal anomalies and the one or more spatial anomalies concurrently.

Next, the computer may generate one or more temporal anomaly events (operation 216) based at least in part on the one or more temporal anomalies, and may generate one or more spatial anomaly events (operation 218) based at least in part on the one or more spatial anomalies. For example, the one or more temporal anomaly events may correspond to one or more temporal clusters of the one or more temporal anomalies, and the one or more spatial anomaly events may correspond to one or more spatial clusters of the one or more spatial anomalies. In some embodiments, the one or more temporal anomaly events may be generated based at least in part on superpositions of instances of a kernel function at the one or more temporal anomalies and a threshold.

Furthermore, the computer may calculate one or more complex events (operation 220) based at least in part on two or more of the one or more temporal anomalies and the one or more spatial anomalies.

Additionally, the computer may evaluate the one or more temporal anomaly events, the one or more spatial anomaly events, and the one or more complex events to determine one or more insights (operation 222) about a problem in the network, and may selectively perform the remedial action (operation 224) associated with the problem based at least in part on the one or more insights. For example, the one or more insights may include or correspond to one or more of: analysis in a time window; analysis of different potential problems in the network; or identification of the problem.

Moreover, the remedial action may include: a recommendation about the problem, a notification about the problem, a report with computed results associated with the problem, or a corrective action in the network associated with the problem. In some embodiments, the corrective action includes: updating firmware, rebooting or providing another type of feedback to at least one of the access points.

In some embodiments, the computer optionally performs one or more additional operations (operation 226). For example, when at least the one performance metric corresponds to a ratio, the computer may compute adjusted values of at least the one performance metric based at least in part on the values of at least the one performance metric and the historical values of at least the one performance metric, and the one or more temporal anomalies or the one or more spatial anomalies may be determined using the adjusted values instead of the values.

Figure 3:
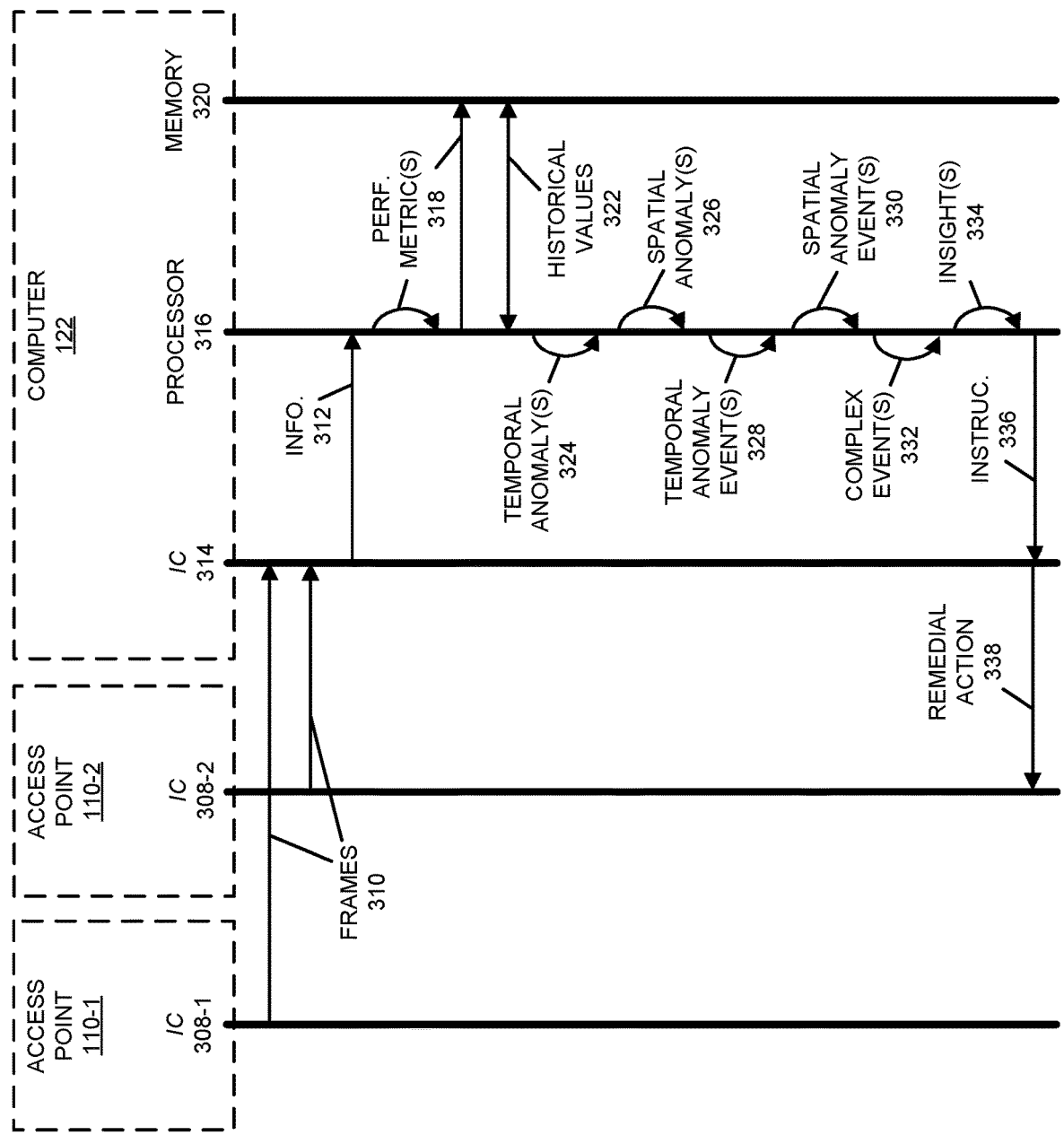
FIG. 3 is a drawing illustrating an example of communication among the electronic devices in FIG. 1 in accordance with an embodiment of the present disclosure.

FIG. 3 presents a drawing illustrating an example of communication among access points 110 and computer 122. In particular, interface circuits (ICs) 308 in access points 110 may transmit frames 310 (or packets) with information 312 summarizing communication performance to computer 122. After receiving frames 310, interface circuit 314 in computer 122 may provide information 312 to processor 316. Then, processor 316 may calculate one or more performance metrics 318 based at least in part on information 312. For example, processor 316 may use a statistical technique (such as a median, a mean, a histogram and/or a kernel-based statistical analysis technique) to calculate the one or more performance metrics 318 based at least in part on information 312. Moreover, processor 316 may store values of the one or more performance metrics 318 associated with the communication by access points 110 in memory 320.

Then, processor 316 may compare current values of the one or more performance metrics 318 for access points 110 with historical values 322 of the one or more performance metrics 318 for access points 110 within multiple temporal contexts in order to determine one or more temporal anomalies 324 for access points 110. Moreover, processor 316 may compare current values of the one or more performance metrics 318 for access points 110 for access points 110 in a spatial context in order to determine one or more spatial anomalies 326 for access points 110.

Next, processor 316 may generate one or more temporal anomaly events 328 based at least in part on the one or more temporal anomalies 324 and one or more spatial anomaly events 330 based at least in part on the one or more spatial anomalies 326.

Furthermore, processor 316 may calculate one or more complex events 332 based at least in part on two or more of the different anomalies, such as the one or more temporal anomalies 324, one or more spatial anomalies 326, the one or more temporal anomaly events 328 and/or the one or more spatial anomaly events 330 to determine one or more insights 334 about a problem in a network (such as a Wi-Fi network).

Furthermore, processor 316 may instruct 336 interface circuit 314 to perform a remedial action 338 associated with the problem based at least in part on the one or more insights 332. For example, interface circuit 314 may provide: a notification associated with the problem, updated firmware to access point 110-1, instructions to reboot to access point 110-1, etc.

While operations in FIG. 3 are illustrated with unilateral or unidirectional communication between components using single-sided arrows, in general one or more of the operations may involve bilateral communication between components (which may be illustrated using dual-sided arrows).

In some embodiments, the detection technique may be used to detect anomalous values of key performance indicators (KPIs) of access points in large-scale Wi-Fi networks. Because of the dynamic and ad-hoc nature of these wireless networks, the detection technique may consider the temporal and spatial contexts of the target KPI samples. Consequently, the detection technique may efficiently provide a high probability of detection and a low probability of a false alarm.

As noted previously, managing large-scale Wi-Fi networks can be challenging. For example, it is typically useful for network administrators or operators to be able to identify and handle network issues such as: a particular access point starts dropping its clients frequently, access points at a particular location are experiencing severe interference, a particular group of access points gets overloaded frequently, etc. However, given the size and ad-hoc nature of Wi-Fi networks, it can be difficult to obtain such insights in a timely manner.

One approach to these challenges is anomaly detection. During anomaly detection, pattern-breaking data points that do not conform to their expected values are identified. As in other complex systems, anomalous samples of KPIs from a particular access point (e.g., RSSI, client counts, session length, traffic, etc.) may indicate significant functional issues in a Wi-Fi network. Therefore, performing continuous, periodic or as-needed monitoring and anomaly detection for various access-point KPIs can be used to ensure that a large-scale Wi-Fi network is operating optimally.

The input data in an anomaly detection technique may be a collection of samples of one or more target measurements. The objective of the anomaly detection technique may be to define a boundary that separates the normal and abnormal values of the target measurement(s), so that each of the input data samples can be marked as normal/abnormal according to its position with respect to the derived boundary.

However, there are often challenges in implementing an anomaly detection technique. In particular, defining the boundary between normal and abnormal values is often difficult. This is especially true when the dimensionality of the date samples becomes large. Moreover, large amounts of high-quality labeled data for training/validating models are usually unavailable. This is often because of: the prohibitive labor cost involved in collecting labeled data manually; and the abnormal values often occur at a much lower frequency than the normal ones, which can make it difficult to collect enough abnormal data samples. In this regard, an unsupervised anomaly detection technique that does not require labeled data may have an advantage over a corresponding supervised anomaly detection technique. Furthermore, noise in the network may corrupt the input data, such that some abnormal data samples are very similar to the normal ones, and vice versa. This may result in miss detections and/or false alarms in the anomaly detection process.

Figure 4:
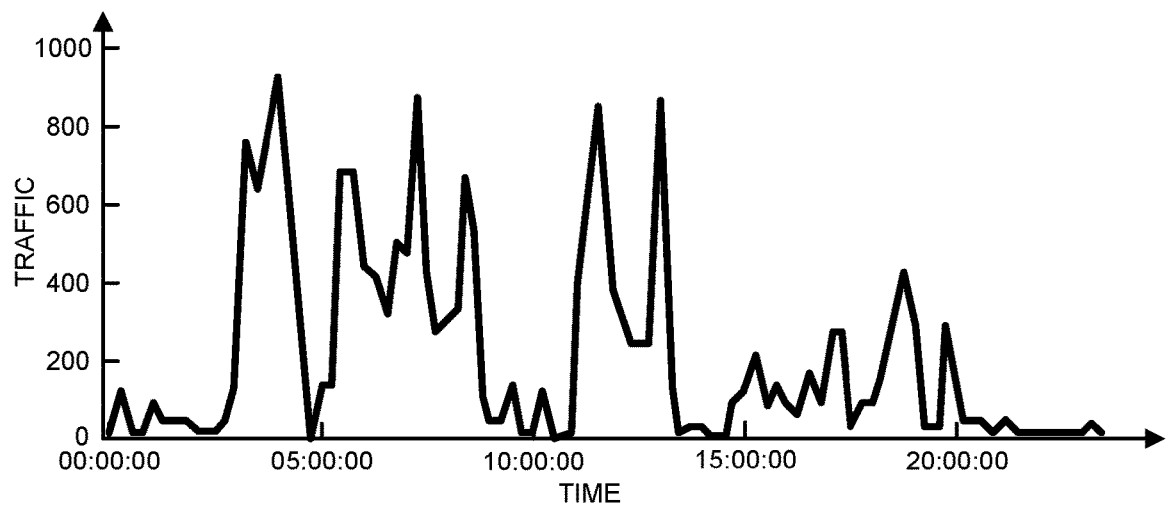
FIG. 4 is a drawing illustrating an example of traffic as a function of time for an access point in FIG. 1 in accordance with an embodiment of the present disclosure.
Figure 5:
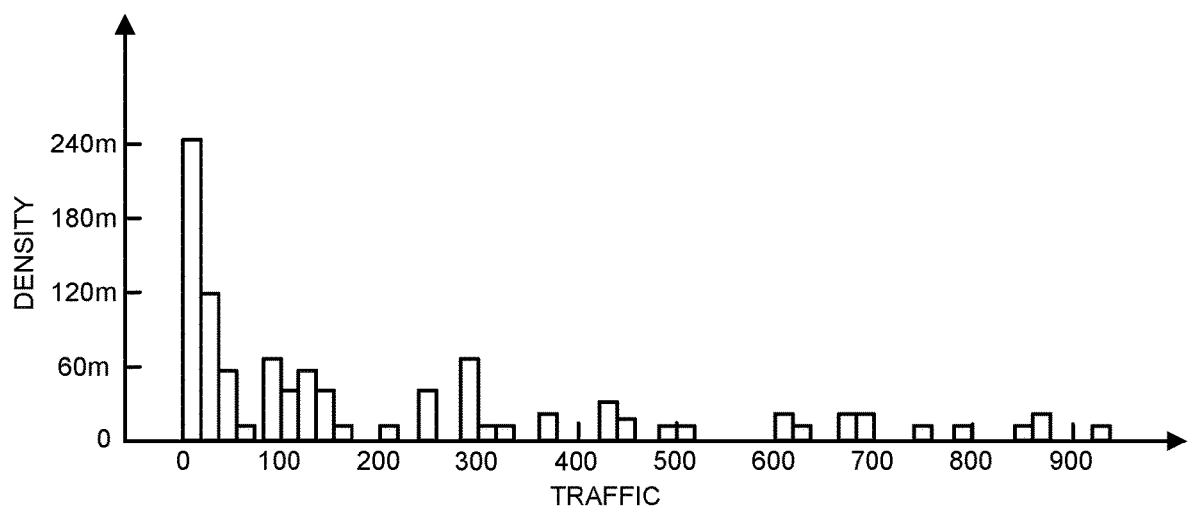
FIG. 5 is a drawing illustrating an example of a histogram of traffic for an access point in FIG. 1 in accordance with an embodiment of the present disclosure.

In addition, the unique characteristics of Wi-Fi networks usually poses additional challenges. For example, many access-point KPIs may have a wide dynamic range and a flattened and long-tailed histogram, which can make it difficult to identify anomalies from a statistic point of view. FIG. 4 presents a drawing illustrating an example of traffic as a function of time on a particular day for one of access points 110 in FIG. 1. In this example, there is a wide dynamic range (0 to 900) in the traffic. Moreover, as shown in FIG. 5, which presents a drawing illustrating an example of a histogram of traffic for one of access points 110 in FIG.

1, the traffic patterns in FIG. 4 are relatively evenly distributed across the whole dynamic range in the 'tail' portion. Consequently, it may be difficult to find a threshold that is can be used to determine whether a given traffic value is anomalous.

Furthermore, many access-point KPIs can vary significantly depending on timing and various environmental factors. This may affect the anomaly detection in several ways. In particular, an access-point KPI sample that is considered perfectly normal at one time point may become an anomaly at another time point. For example, high-data traffic for a particular access point during operation hours in a subway station is expected, but the same high traffic should be flagged as anomalous after the operation hours.

Additionally, an access-point KPI sample collected from a particular access point may be considered as normal, while the same KPI sample may be considered as anomalous if it is collected from another access point in a different environment. For example, while a Wi-Fi session may last up to a few hours from an access point in an office, if the same observation is made for an access point on a subway platform (where people are not supposed to linger more than 10 minutes), it is likely anomalous.

Note that extreme values or drastic changes of the target KPIs do not necessarily constitute an anomaly. This is because these access-point KPIs may be normal reflections of changes of the environmental factors and may not lead to functional issue in the Wi-Fi network. For example, a significant increase of data traffic for a particular access point may be expected when the associated users start using particular data-heavy applications, such as high-definition video streaming. In this case, the drastic increasing of the traffic should not be marked as an anomaly.

Consequently, in Wi-Fi networks, the anomaly detection technique may be used to identify the anomalous values of the target KPIs that cannot be explained by the normal dynamics of the system. To facilitate this capability, the anomaly detection technique may keep the relevant timing and environmental contexts in mind when identifying anomalies based at least in part on access-point KPIs in order to reduce or minimizing the probability of miss detection and/or false alarm.

Figure 6:
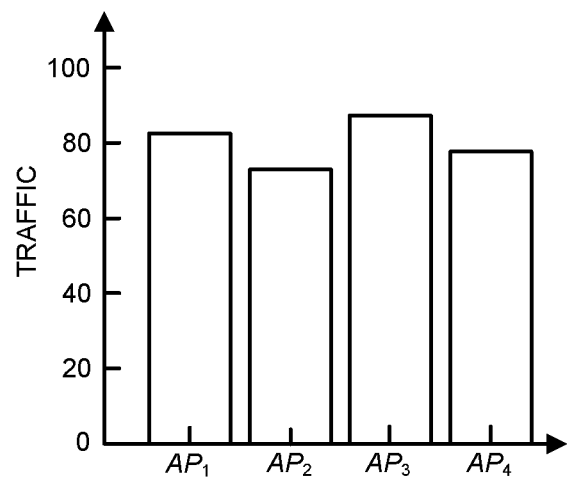
FIG. 6 is a drawing illustrating an example of traffic for different access points in FIG. 1 in accordance with an embodiment of the present disclosure.

For example, assume access point 1 ($AP_1$), access point 2 ($AP_2$), access point 3 ($AP_3$) and access point 4 ($AP_4$) belong to the same Wi-Fi network. FIG. 6 presents a drawing illustrating an example of traffic on day X for these access points. In this example, the objective is to detect if the traffic of $AP_1$ is anomalous on day X However, as shown in FIG. 6, the traffic of all the access points are similar on day X, so an anomaly cannot be detected by simply comparing them.

Figure 7:
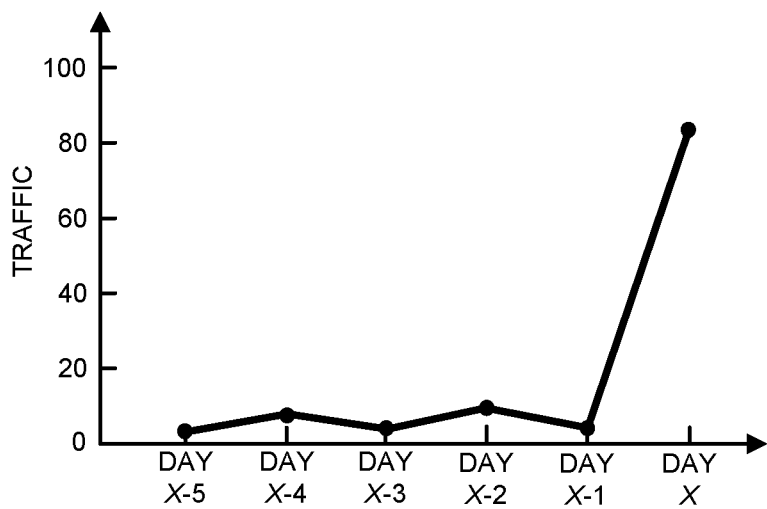
FIG. 7 is a drawing illustrating an example of traffic on different days for an access point in FIG. 1 in accordance with an embodiment of the present disclosure.

Instead, the historical traffic of $AP_1$ may need to be considered in order to fully evaluate its value on day X This is shown in FIG. 7, which presents a drawing illustrating an example of traffic on six consecutive days (X−5 to X) for $AP_1$. As shown in FIG. 7, the historical traffic of $AP_1$ indicates a range of 'normal' values of (0, 8). Therefore, the traffic increase to over 80 (over 10× its normal value) on day X strongly suggests anomalous behavior that would not be detected without considering the timing or temporal context of the traffic measurement.

Even though the anomalous behavior of the traffic of $AP_1$ has been identified in the temporal context, is the traffic of $AP_1$ on day X an anomaly? No. The anomalous behavior as a function of time may only indicate a deviation of the target measurement from its historical 'normal' value. This deviation may be caused by changes in one or more environmental factors. In order to identify true anomalies that cannot be explained by normal system dynamics, the degree and probability of anomalous temporal behaviors may need to be considered, e.g., by investigating the KPI of peer access points that share the same radio environment with $AP_1$.

Figure 8:
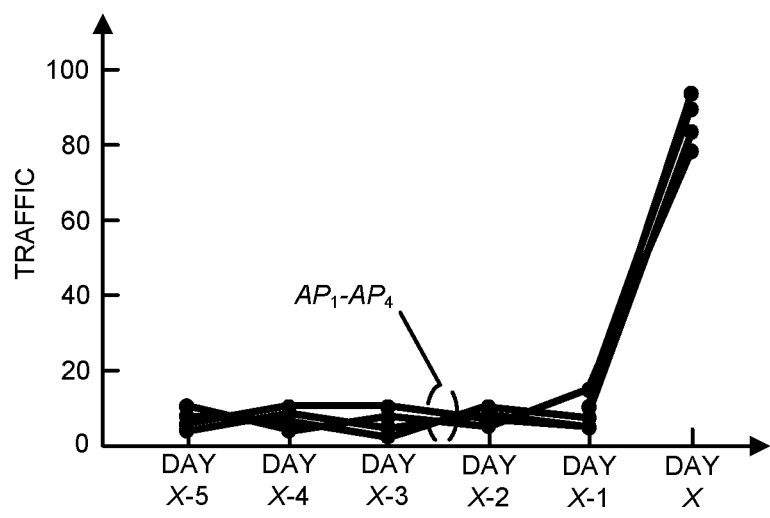
FIG. 8 is a drawing illustrating an example of traffic on different days for access points in FIG. 1 in accordance with an embodiment of the present disclosure.

FIG. 8 presents a drawing illustrating an example of traffic on six consecutive days (X−5 to X) for $AP_1$-$AP_4$. Based on FIG. 8, it is clear that all of the access points have increases in their traffic by approximately 10× on day X, which could be the result of an occasional change of the network usage pattern, e.g., a large group of ad-hoc users may access the network on day X In the context of the peer access points, the traffic of $AP_1$ behaves as expected on day X (i.e., it is not a spatial or peer anomaly). Therefore, an anomaly should not be detected.

In some embodiments of the detection technique, a volume adjustment technique may be selectively used when identifying temporal and/or spatial anomalies. Notably, a ratio-based KPI may, in some embodiments, be calculated by taking the ratio of two or more other KPIs. For example, a RADIUS failure ratio is the ratio of the number of failed network authorization (such as RADIUS) attempts to the number of overall RADIUS attempts. Ratio-based KPIs may be used to describe the status of the network, because they may capture the relative significance of a particular issue against the overall population/duration. However, without the context of the absolute value of the numerator and denominator KPIs (which may cancel out in the ratio calculation), a ratio-based KPI sometimes cannot objectively represent the severity of the issue of interest.

This problem may be more severe when the value for the denominator KPI becomes small. For example, assuming 60 RADIUS attempts evenly distributed over an hour (such as one per minute), among which 30 failed, the RADIUS failure ratio for this hour is 50%, and this result is relatively reliable (when calculated from 60 samples). However, if we try to calculate the RADIUS failure ratio of the first minute by using the only attempt sample in that minute, the result is very unreliable, i.e., 100% if that attempt failed and 0% if that attempt succeeded.

Figure 9:
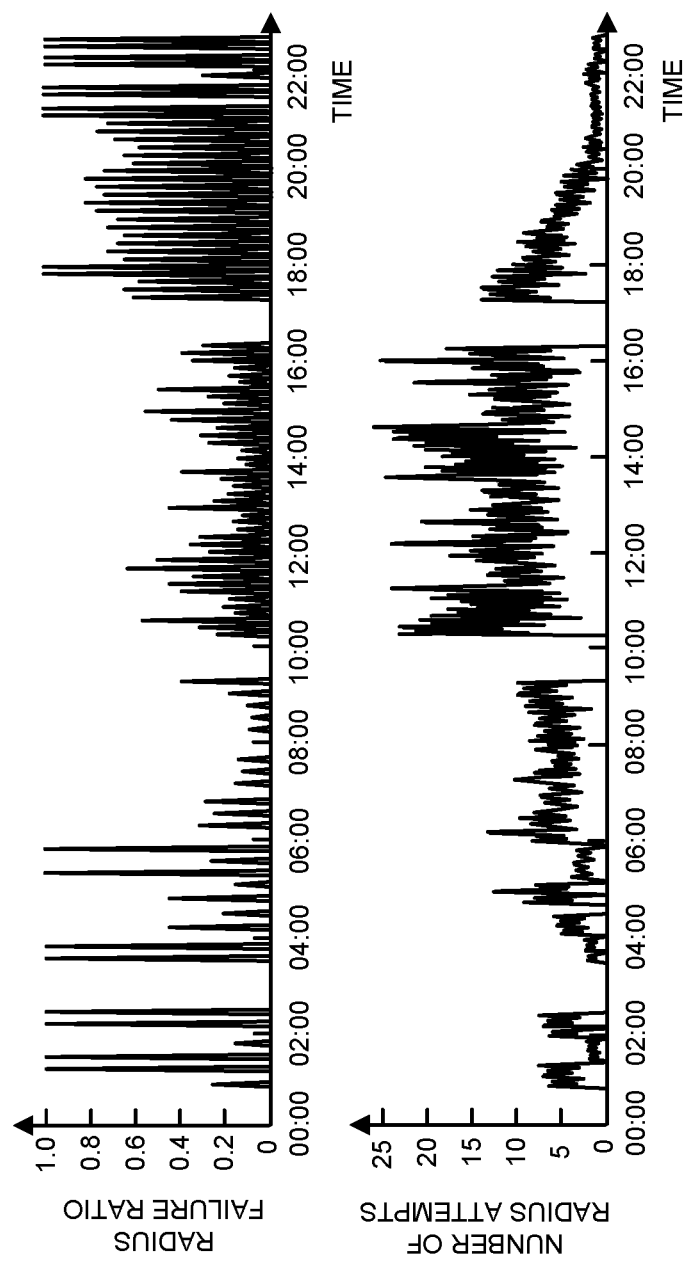
FIG. 9 is a drawing illustrating an example of a RADIUS failure ratio and a corresponding number of RADIUS attempts per bin in the network in FIG. 1 in accordance with an embodiment of the present disclosure.

As another example is shown in FIG. 9, which presents a drawing illustrating an example of a RADIUS failure ratio and a corresponding number of RADIUS attempts per bin (90 seconds) over a day for a network. Note that the RADIUS failure ratio has some extremely high values (e.g., 100%) when the number of RADIUS attempts in the corresponding bin is small. This often occurs at non-working hours when the network is relatively idle. Consequently, in the absence of knowledge of the number of RADIUS attempts, these high RADIUS failure ratio samples may be detected as anomalies, which typically are false alarms.

In order to address this problem, an optional volume adjustment technique may be used to adjust the ratio-based KPIs before performing anomaly detection. This correction may help ensure that the adjusted KPI metrics can better represent the status of the network. Note that in this disclosure, 'volume' may be the absolute values of the numerator and denominator KPIs, as well as the metric describing the impact(s) of the specific issue on the network.

Moreover, some embodiments the detection technique may include complex event processing. Notably, in a large-scale network, a given functional issue may cause multiple symptoms that are reflected in different KPIs. These symptoms may usually appear according to a set of logical rules. For example, when the signal-to-noise ratio decreases at a particular access point, the packet error rate may increase and the capacity may decrease. These changes may occur almost immediately after or concurrently with the decrease in the signal-to-noise ratio. Anomaly detections may help in identifying the anomalous behaviors of the signal-to-noise ratio, the packet error rate and the capacity individually. However, unless the correlation (e.g., the chronological order of the occurrences of the anomalies) between these individual anomalies is captured, it may be difficult to determine the logical relationship among these performance metrics.

In order to address this problem, the detection technique may include a complex event processing (CEP) engine. Note that a CEP engine may perform event processing that combines data from multiple sources to infer events or patterns that suggest more complicated or complex circumstances or events. The CEP engine may discover complex events by identifying predefined patterns (which are sometimes referred to as 'signatures') that describe a given set of logical rules. For example, to use a medical analogy, if a patient is having symptoms of body aches, coughing, sore throat, and fever, he may be diagnosed as having influenza by a CEP engine. Notably, the CEP engine may process the symptoms (which are examples of simple events) using medical knowledge (signatures) to generate a more complex and meaningful conclusion, i.e., that the patient has influenza (which is an example of a complex event).

In the detection technique, there may be three main types of events in a Wi-Fi network: a basic event, an anomaly event, and a complex event. A 'basic event' may be an event generated by the network, such as access-point reboot, client roaming, client disconnect, etc., and thus may indicate a change of state of the network. An 'anomaly event' may be generated by an anomaly detection technique and may indicate a given anomalous behavior of the network. A 'complex event' may be output by the CEP engine by identifying particular logical (causality, membership and/or timing) relationships among one or more basic events, anomaly events, and/or other complex events. Note that a complex event may provide deeper insight into the status of the network than the individual member events on which it may be based.

Moreover, a complex event may be used along with other events to construct a higher-level complex event, in order to provide a more complicated, more specific, and more accurate understanding about the target of interest. For example, a complex event CE1 may have a signature of concurrent occurrences of a RADIUS failure ratio anomaly event and a time-to-connect anomaly event. This complex event may indicate that the anomalously high RADIUS failure ratio is one of the potential causes for a prolonged client connection process. Similarly, a complex event CE2 may have a signature that CE1 occurs and no other connection failures (authentication, association, extensible authentication protocol or dynamic host configuration protocol) occur concurrently. When complex event CE2 occurs, there may a higher level of confidence that the high RADIUS failure ratio is the root cause for the high time-to-connect because the other possibilities have been ruled out.

Furthermore, some embodiments the detection technique may include an insight generator. Notably, the combination of anomaly detection and the CEP engine may provide information that captures network issues and diagnoses their root causes. These functions may be performed by insight generator, which may present the results and insights to users in an accurate and intuitive manner. Notably, the insight generator may perform: anomalous period analysis in order to determine when and how long the network was impacted by the issue of interest; impacted client analysis in order to determine how many clients were impacted by the issue of interest, how badly they were affected, and whether the impacted clients share common attributes (e.g., device type, type of operating system, etc.); impacted access-point analysis in order to determine how many access-points were impacted by the issue of interest, how badly they were affected, and whether the impacted access points share common attributes (e.g., access point model, firmware version, service endpoint, radio-frequency neighborhood, etc.); and root cause analysis in order to determine or identify the real causes for the issue of interest.

In the discussion of the detection technique, note that a target access point may be the access point whose operation status is of interest. Moreover, the target KPI may be the KPI of the target access point whose anomalous values are of interest, and the target KPI sample may be the sample of the target KPI on which the anomaly detection is performed. Furthermore, the target time instant may be the time point (range) when the target KPI sample is collected or aggregated. Depending on the frequency that the target KPI is collected or aggregated, it may correspond to different time units, e.g., 30 s, 30 min, a day, etc.

Additionally, the target time instant may be the time point (range) when the target KPI sample is collected or aggregated. Depending on the frequency that the target KPI is collected or aggregated, it may correspond to different time units, e.g., 30 s, 30 min, a day, etc. Moreover, the target anomaly direction may be the direction in which the target KPI samples with extreme values is considered as anomalous. For example, the target anomaly direction for a RADIUS failure ratio may be 'high', and the target anomaly direction for capacity may be 'low'.

The temporal context may be a logical time or time window within which the values of the samples of the target KPI may have similar values. Note that the temporal context of the target KPI sample may include the target time instant, which may or may not be a continuous time range. Instead, the temporal context may include a collection or a sequence of discrete time ranges, such as 'from 8:00 to 9:00 am on every Tuesday for the previous month'. The temporal context may be used to define how the target KPI usually or typically behaves. Therefore, the temporal context may be used to determine if an anomaly occurs in a temporal perspective.

Moreover, the spatial context may be a logical group of access points (including a target access point) whose members are affected by environmental factors that are similar to those of the target access point. These environmental factors may include, but are not limited to, one or more characteristics of: the deployed environment, the network infrastructure, the dynamics of the network usage, the types of the client devices, etc. Note that the spatial context of the target KPI sample may include the target access point and access points that are deployed in the geographic vicinity of or proximate to the target access point (such as access points in the same building, the same town, the same radio-frequency environment, etc.). In general, access points may be assigned to a spatial context because that they usually operate under similar environmental factors. However, in general, the spatial context may not be determined solely based at least in part on geographical location. For example, it is possible that access points in two different buildings have similar environmental factors, and thus may be assigned to the same spatial context group. The spatial context may be used to define how the target KPI generally behaves across access points with environmental factors similar to the target access point (and, more generally, how it reacts to environment changes), and thus it can be used to determine if an anomaly occurs in a spatial (peer) perspective.

In this discussion, it is assumed that, under both the temporal and spatial contexts, normal KPI samples occur far more frequently than anomalous ones. This assumption may be a prerequisite for any unsupervised anomaly detection techniques, and it is, in general, true in Wi-Fi networks.

We now describe an anomaly detector. Notably, the anomaly detector may include a trending, seasonal and global (TSG) anomaly detector. Trending, seasonal and global may each correspond to a type of temporal context. A trending temporal context may include a small time window (such as, e.g., 20 min) that includes and ends at the target time instant. Target KPI samples within the trending temporal context may describe the behavior of the target KPI in a temporal vicinity of the target time instant. When a local pattern of target KPI is violated by the current target KPI sample in the target anomaly direction, a 'trending anomaly' may be detected.

Moreover, a 'seasonal temporal context' may include a logical time window (such as a day, a week, etc.) that includes a collection of discrete time points (ranges). Each of the time points (ranges) may have a time offset to the target KPI instant that equals an integral multiple of the period of the target KPI. For example, for a given target KPI with a weekly pattern, a valid seasonal temporal context may be 'from 8:00-9:00 am every Monday for the past one month'. When the periodic pattern of target KPI is violated by the current target KPI sample in the target anomaly direction, a 'seasonal anomaly' may be detected.

Furthermore, a 'global temporal context' may include a large time window (such as a month) that includes and ends at the target time instant. Samples of a target KPI within the global temporal context may describe the behavior of the target KPI across a long period of time. When the long-term pattern of target KPI is violated by the current target KPI sample in the target anomaly direction, a 'global anomaly' may be detected.

Figure 10:
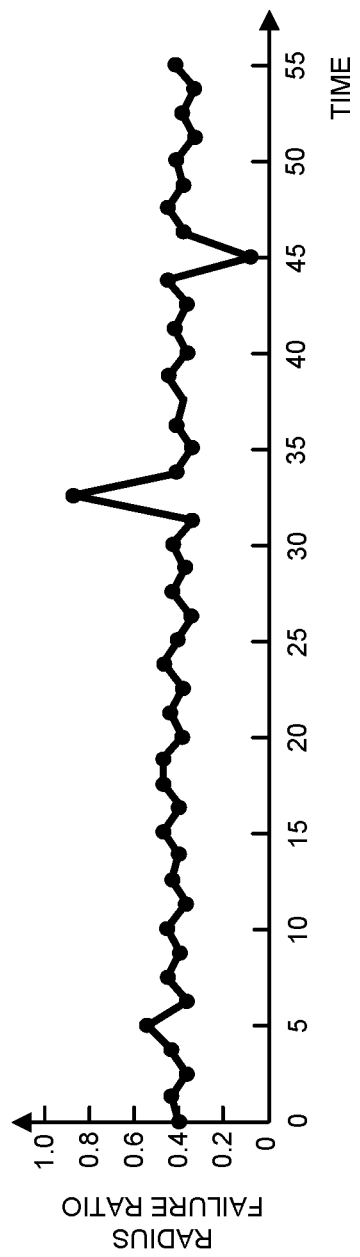
FIG. 10 is a drawing illustrating an example of a trending anomaly of a RADIUS failure ratio in FIG. 1 in accordance with an embodiment of the present disclosure.

FIG. 10 presents a drawing illustrating an example of a trending anomaly of a RADIUS failure ratio. In FIG. 10, the sample at time 32.5 may break the local pattern within its trending temporal context (e.g., time 31.25, 30, 28.75, etc.) in the target anomaly direction (e.g., 'high'), and thus may be detected as a trending anomaly. Alternatively, the sample at time 45 may also break the local pattern within its trending temporal context (e.g., time 43.75, 42.5, 41.25, etc.) but in the opposite direction (e.g., 'low'). Therefore, the sample at time 45 may not be detected as a trending anomaly.

Figure 11:
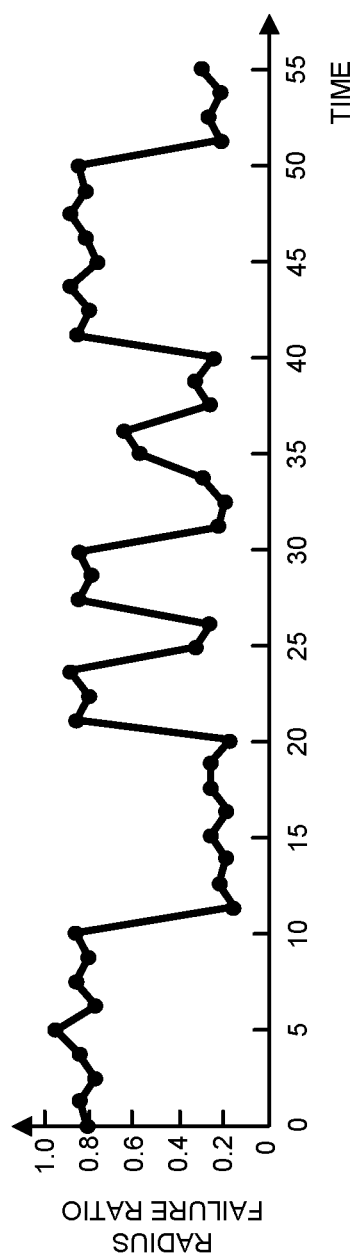
FIG. 11 is a drawing illustrating an example of seasonal anomaly of a RADIUS failure ratio in FIG. 1 in accordance with an embodiment of the present disclosure.

FIG. 11 presents a drawing illustrating an example of a seasonal anomaly of a RADIUS failure ratio. In FIG. 11, the RADIUS failure ratio may have a period of approximately 20. Comparing the sample at times 35 with samples within its seasonal temporal context (e.g., time 55, 45, 15, etc.), it may be apparent that this sample violates the pattern in its seasonal temporal context in the target anomaly direction (e.g., 'high'), and thus may be detected as a seasonal anomaly. Alternatively, samples at time 25 and 26 may violate the seasonal pattern in the opposite direction (e.g., low'). Therefore, these samples may not be detected as seasonal anomalies.

Figure 12:
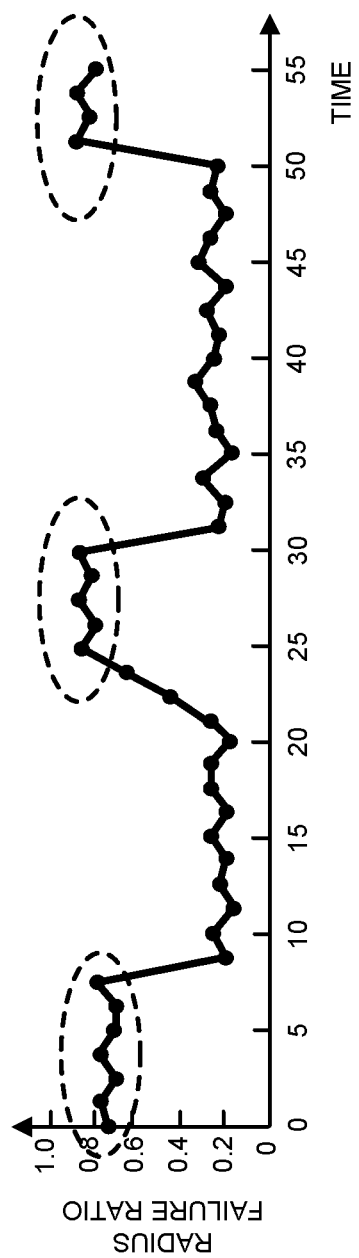
FIG. 12 is a drawing illustrating an example of a global anomaly of a RADIUS failure ratio in FIG. 1 in accordance with an embodiment of the present disclosure.

FIG. 12 presents a drawing illustrating an example of a global anomaly of a RADIUS failure ratio. In FIG. 12, by considering all the samples, it may be apparent that the circled samples (around values of 0.7) violate the long-term pattern of the target KPI (which fluctuates around 0.2) in the target anomaly direction ('high'), and thus may be detected as a global anomaly.

Note that the detections of trending, seasonal, and global anomalies may each capture a specific type of anomalous behavior of the target KPI. While some samples may be detected as anomalies by multiple anomaly detections, some anomalous samples can only be detected by a given type of detection. For example, in FIG. 11, the sample at time 35 may be detected using seasonal anomaly detection, but it may not be detected by trending or global anomaly detection. Alternatively, in FIG. 12, the sample at time 55 may be detected using global anomaly detection, but it may not be detected by trending or seasonal anomaly detection. The TSG anomaly detector may combine these three types of anomaly detection to provide improved accuracy in capturing different types of temporal anomalies of the target KPI.

Moreover, the anomaly detector may include a spatial anomaly detector. Notably, temporal anomalies may be detected by the TSG anomaly detector when a target KPI sample fails to comply with its historical pattern. However, in some embodiments, in which the target KPI sample complies with its trending, seasonal, and global temporal context pattern, it may have a deviation (in the target anomaly direction) from its peers collected from other access points in its spatial context.

Figure 13:
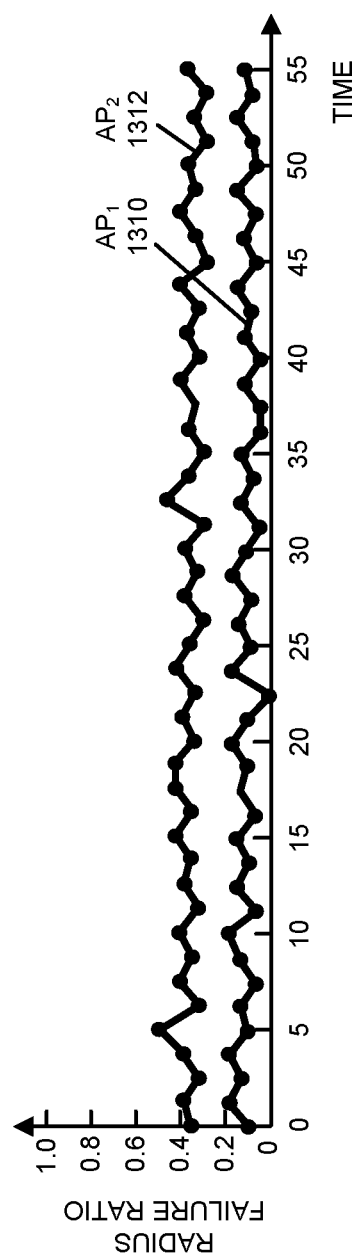
FIG. 13 is a drawing illustrating an example of a spatial anomaly of a RADIUS failure ratio in FIG. 1 in accordance with an embodiment of the present disclosure.

For example, FIG. 13 presents a drawing illustrating an example of a spatial anomaly of a RADIUS failure ratio. Notably, FIG. 13 shows the RADIUS failure ratios for $AP_1$ 1310 and $AP_2$ 1312 from the same spatial context. While most of samples from $AP_2$ 1312 may not be detected as temporal anomalies, in general they have significantly higher values compared to their peers from $AP_1$ 1310. Consequently, these samples may be detected as spatial anomalies.

The following notations may be used in the next discussion. There is a Wi-Fi network with N access points, i.e., $AP_1$, $AP_2$, $AP_N$. Moreover, $k_{i,j}$ may denote a given ratio-based target KPI sample that is collected from AP, at time instant j. For example, $k_{i,j}$ may represent the failure ratio of another KPI, e.g., a RADIUS failure ratio. Therefore, $k_{i,j}$ may have a target anomaly direction of 'high'. Moreover, the number of attempts and failures for calculating may be denoted as and respectively. In cases where $k_{i,j}$ is not a failure ratio, $A_{i,j}$ and $F_{i,j}$ may denote the denominator and the numerator for calculating $k_{i,j}$.

Furthermore, the number of clients that were associated with AP, at time instant j may be denoted as $C_{i,j}$. The target time instant may be denoted as t. Additionally, the trending, seasonal, and global temporal contexts of the target sample may be denoted as $TTC_{i,j}$, $ST_{i,j}$ and $GTC_{i,j}$, respectively. The spatial contexts of the target sample $k_{i,j}$ may be denoted as $SC_{i,j}$.

Note that the objectives of the detection technique may be to: determine if the target KPI sample $k_{i,j}$ is an anomaly, in temporal and/or spatial perspectives; generate anomaly events over time periods where corresponding anomalies cluster together; apply CEP to identify correlations behind basic events; and extract useful insights from basic and complex events.

During volume adjustment, an anomaly detection (AD) engine may calculate a historical value of $k_{i,t}$ over $GTC_{i,t}$ as $$\square_{i,t} = \text{median}\{k_{i,j}|j \in GTC_{i,t}\}. \qquad (1)$$

While Eqn. 1 is illustrated with the median function, this is for purpose of illustration. In other embodiments, other function or moment may be used. In general, a wide variety of statistical techniques that represent the collective behavior of $k_{i,j}$ over $GTC_{i,t}$ may be used to calculate $h_{i,t}$. For example, the statistical techniques may include: a mean, a histogram, a kernel-based technique, etc.

Then, the AD engine may calculate a volume-adjusted target KPI sample $k'_{i,t}$ as $$k'_{i,t} = \left(\frac{A_{i,t}}{\max(A_{i,t}, A_{min})} \cdot k_{i,t} + \left(1 - \frac{A_{i,t}}{\max(A_{i,t}, A_{min})}\right) \cdot \square_{i,t}\right) \cdot \exp(-\theta(F_{i,t})C_{i,t}), \quad (2)$$

where the parameter $A_{min}$ denotes the minimum number of attempts for calculating a statistically reliable ratio-based KPI target sample. As shown in Eqn. 2, when the number of attempts $A_{i,t}$ is smaller than $A_{min}$, $k'_{i,t}$ may be calculated based at least in part on a weighted average of the raw sample value $k_{i,t}$ and its historical value $h_{i,t}$. Note that $k_t$ may be used to mitigate the impact of extreme values of $k_{i,t}$ caused by small $A_{i,t}$ (e.g., $k_{i,t}$ may be 100% when $A_{i,t}$ equals $F_{i,t}$, which equals 1). Thus, when $A_{i,t}$ is larger, a higher weight (or trust) is given to the raw value $k_{i,t}$, and a lower weight (or trust) is given to the historical value $h_{i,t}$. Finally, when $A_{i,t}$ is sufficiently large to provide a statistically reliable ratio, e.g., when $A_{i,t}$ is greater than or equal to $A_{min}$, $k_t$ may no longer effect the calculation.

The weighted average of $k_{i,t}$ and $h_{i,t}$ may be adjusted by the number of associated clients $C_{i,t}$ via an exponential function $\exp(-\theta(F_{i,t}) C_{i,t})$, where the function $\theta(F_{i,t})$ may control or specify the degree of the adjustment. Note that depending on the use case, a different $\theta(F_{i,t})$ may be used. For example, an access point with a large number of associated clients may have a larger connection failure ratio, because it may be operating in a busy mode. Alternatively, it may appear more anomalous if a relatively idle access point with a few associated clients to have the same connection failure ratio. In order to reflect this difference, some relief to the connection failure ratio may be given when the number of associated clients is large, and the degree of relief may decrease as the number of failures increases (which may avoid the AD engine failing to detect a catastrophic scenario). In these embodiments, the function $\theta(F_{i,t})$ may be a decreasing function of $F_{i,t}$ with positive values, e.g., $\theta(F_{i,t})=\exp(-\alpha \, F_{i,t})$, where a is a parameter adjusting the sensitivity or dependence of $\theta(F_{i,t})$ on $F_{i,t}$. Note that when $\theta(F_{i,t})$ equals 0, no adjustment based at least in part on $C_{i,t}$ may be performed.

During temporal anomaly detection, the AD engine may collect valid samples for trending, seasonal, and global temporal contexts at t, i.e., $TTS_{i,t}$, $STS_{i,t}$, and $GTS_{i,t}$, which may respectively be calculated as $$TTS_{i,t}=\{k_{i,j}|j \in TTS_{i,t}, k_{i,j}<F^{-1}(q)\}, \quad (3)$$

$$STS_{i,t}=\{k_{i,j}|j \in STS_{i,t}, k_{i,j}<F^{-1}(q)\}, \text{ and} \quad (4)$$

$$GTS_{i,t}=\{k_{i,j}|j \in GTS_{i,t}, k_{i,j}<F^{-1}(q)\}. \quad (5)$$

$F^{-1}(q)$ may denote the $q^{th}$ percentile of $\{k_{i,j}|j \in GTC_{i,t}\}$, where the parameter q denotes a threshold for determining if a target KPI sample is statistically reliable to be used as a temporal context sample. For example, q may have a value in the range 75-95.

Note that $k_{i,j}$ may represent a failure ratio with a target anomaly direction of 'high'. Therefore, by selecting the target KPI samples below $F^{-1}(q)$, the KPI samples that are likely to be anomalous, and thus being unsuitable to be used as temporal context samples for may be excluded.

Then, the AD engine may compute the median absolute deviations (MAD) of $TTS_{i,t}$, $STS_{i,t}$, and $GTS_{i,t}$ as $$m(TTS_{i,t})=\text{median}(|\{x-_{median}(TTS_{i,t})|x \in TTS_{i,t}\}|), \quad (6)$$

$$m(STS_{i,t})=\text{median}(|\{x-\text{median}(STS_{i,t})|x \in STS_{i,t}\}|), \text{ and} \quad (7)$$

$$m(GTS_{i,t})=\text{median}(|\{x-\text{median}(GTS_{i,t})|x \in GTS_{i,t}\}|). \quad (8)$$

The trending, seasonal, and global temporal anomaly flags for $k_{i,t}$ may be denoted as $TTA_{i,t}$, $STA_{i,t}$, and $GTA_{i,t}$. The AD engine may calculate these parameters. Notably, $TTA_{i,t}$ may be calculated as $$k_{i,t}>\eta_2 \text{ when } |TTS_{i,t}|>\eta_3,$$

$$k_{i,t}>\min(\eta_1 \cdot m(TTS_{i,t})+\text{median}(TTS_{i,t}),\eta_2) \text{ when } |TTS_{i,t}| \geq \eta_3. \quad (9)$$

Moreover, $STA_{i,t}$ may be calculated as $$k_{i,t}>\eta_2 \text{ when } |STS_{i,t}|>\eta_3,$$

$$k_{i,t}>\min(\eta_1 \cdot m(STS_{i,t})+\text{median}(STS_{i,t}),\eta_2) \text{ when } |STS_{i,t}| \geq \eta_3. \quad (10)$$

Furthermore, $GTA_{i,t}$ may be calculated as $$k_{i,t}>\eta_2 \text{ when } |GTS_{i,t}|>\eta_3,$$

$$k_{i,t}>\min(\eta_1 \cdot m(GTS_{i,t})+\text{median}(GTS_{i,t}),\eta_2) \text{ when } |GTS_{i,t}| \geq \eta_3. \quad (11)$$

In these calculations, the parameter $\eta_1$ may define or specify the tradeoff between false alarm and misdetection. For example, $\eta_1$ may have a value between 5-10. Moreover, the parameter $\eta_2$ may denote a service level agreement threshold. The value range of $\eta_2$ may depend on the KPI sample of interest. For example, for a RADIUS failure ratio, a typical value form may be 0.5-0.8. Note that checking the service level agreement may be optional, and service level agreement checking may not occur when $\eta_2$ has a large value (e.g., greater than one). Furthermore, the parameter $\eta_3$ may denote the minimum number of valid KPI samples in each temporal context that are used to perform a statistically reliable calculation. For example, m may have a value between 7-10. When the number of valid KPI samples is less than $\eta_3$, the anomaly flag may be calculated solely based at least in part on service level agreement checking.

During spatial anomaly detection, the AD engine may assume that the spatial context $SC_{i,t}$ includes N access points, and that the collection of spatial context samples for $k_{i,t}$ is denoted as $$SS_{i,t}=\{k_{p,t}|p=1,2,\ldots,N\}, \quad (12)$$

where $k_{p,t}$ denotes the KPI sample collected at $AP_p$ at target time instant t. Note that $k_{i,t} \in SS_{i,t}$.

Then, the AD engine may check whether to perform spatial anomaly detection for $SS_{i,t}$. The list of unique gaps between two consecutive members of the ascending-sorted version of $SS_{i,t}$ may be denoted as $$GSS_{i,t}=\text{unique}(\{SS'_{i,t}(l)-SS'_{i,t}(l-1)|l=2,3,\ldots,N\}), \quad (13)$$

where $SS'_{i,t}$ is the result of sorting $SS_{i,t}$ in ascending order, and $SS'_{i,t}(1)$ denotes the $1^{th}$ sample of $SS'_{i,t}$. Moreover, the flag $NSAD_{i,t}$ denoting whether to perform spatial anomaly detection may be calculated as $$\frac{\sqrt{N-1} \cdot (\max(GSS_{i,t}) - \text{mean}(GSS_{i,t}))}{std(GSS_{i,t})} > Q^{-1}_{N-2}(\eta_4) \text{ when } N > 2, \quad (14)$$

and may be false when $N \leq 2$. Note that $Q^{-1}_{N-2}(\eta_4)$ may define the value of the t distribution with $N-2$ degrees of freedom for left-tail probability of $\eta_4$, and the parameter $\eta_4$ may have a value range of 0.8-0.99.

Assuming that $NSAD_{i,t}$ is true, the AD engine may separate $SS'_{i,t}$ into two groups, an anomalous group and a normal group at the largest gap, i.e., $\max(GSS_{i,t})$. These are denoted as $ASS_{i,t}$ and $NSS_{i,t}$, respectively. Moreover, the AD engine may calculate the average intra-group distance of $ASS_{i,t}$, $\varsigma(ASS_{i,t})$, as $$\text{mean}(\{|ASS_{i,t}(x) - ASS_{i,t}(y)| \forall ASS_{i,t}(x) \in ASS_{i,t}, \forall ASS_{i,t}(y) \in ASS_{i,t}, x \neq y\}) \quad (15)$$

Furthermore, the AD engine may calculate the average inter-group distance of $ASS_{i,t}$, $\rho(ASS_{i,t})$, as $$\text{mean}(\{|ASS_{i,t}(x) - NSS_{i,t}(y)| \forall ASS_{i,t}(x) \in ASS_{i,t}, \forall NSS_{i,t}(y) \in NSS_{i,t}\}). \quad (16)$$

The calculations in Eqns. 15 and 16 may be repeated by separating $ASS_{i,t}$ from the last iteration into anomalous and normal groups until $$\frac{\rho(ASS_{i,t})}{\varsigma(ASS_{i,t})} > \eta_5, \quad (17)$$

where the parameter m may specify or define the tradeoff between a false alarm and misdetection. For example, m may have a value range of 2-5.

Next, the AD engine may calculate a union of the samples left in $ASS_{i,t}$ and the samples in $SS_{i,t}$ that exceed a service level agreement threshold as $$FASS_{i,t} = ASS_{i,t} \cup \{k_{p,t} | k_{p,t} \in SS_{i,t}, k_{p,t} > \eta_2\}, \quad (18)$$

where $\eta_2$ may specify or define the service level agreement threshold, and its value range may depend on the KPI sample of interest. For example, for a RADIUS failure ratio, a value range for $\eta_2$ may be 0.5-0.8. Note that the service level agreement check may be optional, and may not occur when $\eta_2$ has a large value (e.g., greater than one).

Furthermore, the AD engine may determine the spatial anomaly flag for $k_{i,t}$, $SA_{i,t}$, as true if $k_{i,t} \in FASS_{i,t}$ and false if $k_{i,t} \in FASS_{i,t}$.

The AD engine may use an anomaly event density to generate anomaly events by identifying the time periods in which given types of anomalies cluster together. A time window centered at target time instant t may be denoted as $W = [t_{-w}, t_{-w+1}, \ldots, t_{-1}, t, t_1, \ldots, t_{w-1}, t_w]$, where the window width equals $2w+1$, and the parameter w may have a value range of 2-10. Moreover, the AD engine may detect a given type of anomaly (e.g., a trending temporal anomaly on a RADIUS failure ratio) within W, and the list of time instants at which these anomalies are detected may be denoted as $TTAT_i$. Note that $TTAT_{i,v}$ may be true $\forall v \in TTAT_i$, where $TTAT_i = [t_{a1}, t_{a2}, \ldots, t_{aM}]$ and $t_{a1}, t_{a2}, \ldots, t_{aM} \in W$.

Furthermore, the AD engine may calculate the anomaly event density $PTTA_{i,t}$, i.e., the probability of the target KPI being anomalous at t, as $$\Sigma_{\forall t_j \in TTAT_i} K(t - t_j), \quad (19)$$

where the kernel function K(u) is given as $$\frac{1}{\sigma\sqrt{2\pi}} \exp\left(-\frac{u^2}{2\sigma^2}\right). \quad (20)$$

Note that the parameter $\sigma$ may specify or define the kernel width, and may have a value range of 1-5 (in the same unit of the target time instant). While a Gaussian kernel is used in Eqn. 20 for illustrative purposes, in other embodiments different kernel functions may be used (e.g., a triangular kernel, a quartic kernel, a cosine kernel, etc.).

Additionally, the AD engine may compare $PTTA_{i,t}$ with a pre-defined threshold $\eta_6$, which may have a value range of 0.1-0.3. Let $PTTA_{i,t}(s)$ denote the $s^{th}$ time periods that are segregated by the intersections of $PTTA_{i,t}$ and $\eta_6$. The AD engine may generate a trending temporal anomaly event over $PTTA_{i,t}(s)$ if $$PTTA_{i,t} > \eta_2 \forall t \in PTTA_{i,t}(s). \quad (21)$$

The anomaly event density for seasonal and global temporal anomalies, as well as a spatial anomaly, i.e., $PSTA_{i,t}$, $PGTA_{i,t}$, and $PSA_{i,t}$, may be calculated the same way as in Eqn. 19, and the corresponding anomaly events may be generated in the same way as Eqn. 21.

During the detection technique, an insight generator (IG) engine may perform impact analysis. Notably, the IG engine may use association rule learning (ARL) to evaluate the statistical significance of the correlation between a given network issue and different network attributes. ARL may help answer questions, such as does a RADIUS failure issue equally impact clients in the network that use different operating systems?

A set of records of the network may be denoted as $R = \{r_1, r_2, \ldots, r_n\}$, where each record $r_i$ may describe the status of the network at time instant i by a series of attributes (such as binary attributes). For example, $r_i(1)$ may denote 'whether a client is having a RADIUS failure', while $r_i(2)$ may denote 'whether the client has a first type of operating system', and $r_i(3)$ may denote 'whether the client has a second type of operating system', etc. The IG engine may determine the support of a given observation (e.g., attribute X equals x) as $$supp(X = x) = \frac{|\{r_i \mid \forall r_i \in R, r_i(X) = x\}|}{|R|}. \quad (22)$$

Then, IG engine may calculate the lift between attribute X and Y, lift(X=x, Y=y), as $$\frac{supp(X = x, Y = y)}{supp(X = x) \cdot supp(Y = y)} = \quad (23)$$

$$\frac{|R| \cdot |\{r_i \mid \forall r_i \in R, r_i(X) = x, r_i(Y) = y\}|}{|\{r_i \mid \forall r_i \in R, r_i(X) = x\}| \cdot |\{r_i \mid \forall r_i \in R, r_i(Y) = y\}|}.$$

When lift(X=x, Y=y) is greater than one, the attributes X and Y may be positively correlated. Alternatively, when lift (X=x, Y=y) equals one, the attributes X and Y may be independent. And when lift(X=x, Y=y) is less than one, the attributes X and Y may be negatively correlated. For example, lift(RADIUS failure, first type of operating system) greater than one and lift(RADIUS failure, second type of operating system) less than one may indicate that the RADIUS failure issue in the network has a bigger impact on electronic devices that use the first type of operating system than electronic devices that use the second type of operating system.

While the preceding discussion illustrated the detection technique using a variety of analysis and statistical techniques, in some embodiments the detection technique may use additional or different analysis and statistical techniques, such as an unsupervised learning technique (e.g., a type of clustering), a supervised learning technique (such as LASSO, classification and regression trees, support vector machines, linear regression, nonlinear regression, Logistic regression) and/or a neural network (such as a convolutional neural network, generative adversarial networks, a recurrent neural network, a self-training neural network or deep learning, etc.).

Figure 14:
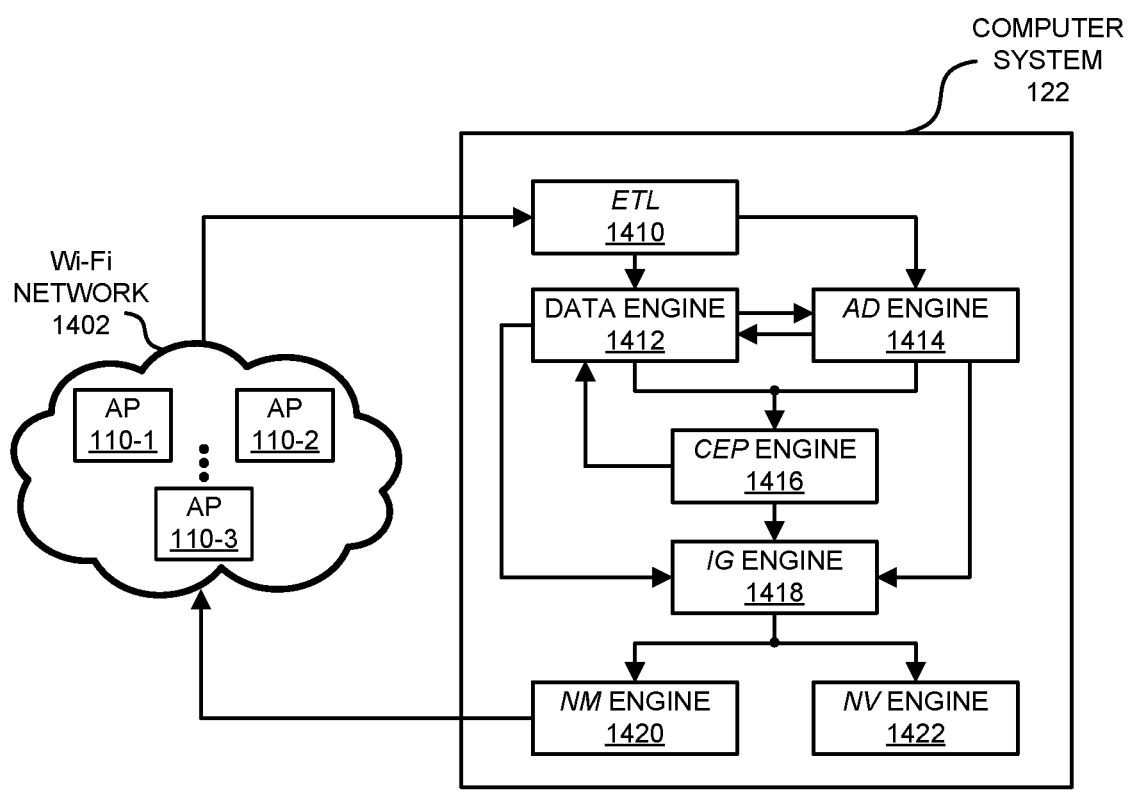
FIG. 14 is a block diagram illustrating an example of a performance monitoring and anomaly diagnosis system in FIG. 1 in accordance with an embodiment of the present disclosure.

Referring back to FIG. 1, computer 122 (which is sometimes referred to as a 'performance monitoring and anomaly diagnosis system' or a PMADS system) may implement at least some of the aforementioned operations in the detection technique. FIG. 14 presents a block diagram illustrating an example of a PMADS system 1400. This PMADS system may include: an extract-transform-load (ETL) engine (or module) 1410, data engine (or module) 1412 that stores data in data structures or databases (e.g., in memory), AD engine (or module) 1414, CEP engine (or module) 1416, IG engine (or module) 1418, network maintainer (NM) engine (or module) 1420 and/or notification and visualization (NV) engine (or module) 1422. ETL engine 1410 may periodically or continuously receive data reports that contains various basic events and KPIs from access points in a Wi-Fi network 1402. The data reports may have a variety of formats (such as a Google protocol buffer, comma separated variable, extensible markup language, JavaScript object notation, etc.). Then, ETL engine 1410 may extract the basic events and target KPI samples and optionally transforms them into a structured format further processing. Next, ETL engine 1410 may send the basic events and target KPI samples to data engine 1412 and AD engine 1414.

Data engine 1412 may store the basic events and target KPI samples received from ETL engine 1410. Moreover, data engine 1412 may send information that specifies temporal and/or spatial contexts of the target KPI samples to AD engine 1414. Furthermore, data engine 1412 may: store anomaly detection results (such as identified anomaly events) for a target KPI sample, which may be received from AD engine 1414; sends basic events, anomaly events, and/or complex events to CEP engine 1416; store the complex event processing results (such as complex events), which may be received from CEP engine 1416; and/or send the basic events, anomaly events, and/or complex events along with their relevant attributes to IG engine 1418.

Moreover, AD engine 1414 may receive the target KPI samples from ETL 1410 and/or context information from data engine 1412. Then, AD engine 1414 may perform anomaly detection on the target KPI samples. Next, AD engine 1414 may sends the anomaly detection results (such as any identified anomaly events) to data engine 1412, CEP engine 1416 and/or IG engine 1418.

Furthermore, CEP engine 1416 may receive anomaly events from AD engine 1414, and/or may receive basic events, anomaly events, and/or complex events from data engine 1412. Then, CEP engine 1416 may perform complex event processing and may generate complex events based at least in part on the received basic events, anomaly events, and/or complex events. Next, CEP engine 1416 may send the complex event processing result (such as identified complex events) to data engine 1412 and IG engine 1418.

Additionally, IG engine 1418 may receive anomaly events from AD engine 1414, and/or may receive basic events, anomaly events, and/or complex events from data engine 1412. Then, IG engine 1418 may generate useful insights by performing anomalous periods analysis, impact analysis, and/or root cause analysis. Next, IG engine 1418 may send the generated insights to NM engine 1420 and NV engine 1422.

NM engine 1420 may receive insights from IG engine 1418. Then, NM engine 1420 may attempt to resolve issues in Wi-Fi network 1402, whose root causes are identified based at least in part on the complex event processing. For example, NM engine 1420 may execute corresponding network management commands, e.g., access-point reboot, access-point firmware upgrade, access-point channel switching, user traffic throttling, etc. Thus, NM engine 1420 may perform one or more remedial actions in response to an identified anomaly. Alternatively or additionally, NM engine 1420 may, via NV engine 1422, provide a recommendation to an electronic device associated with a user.

Figure 15:
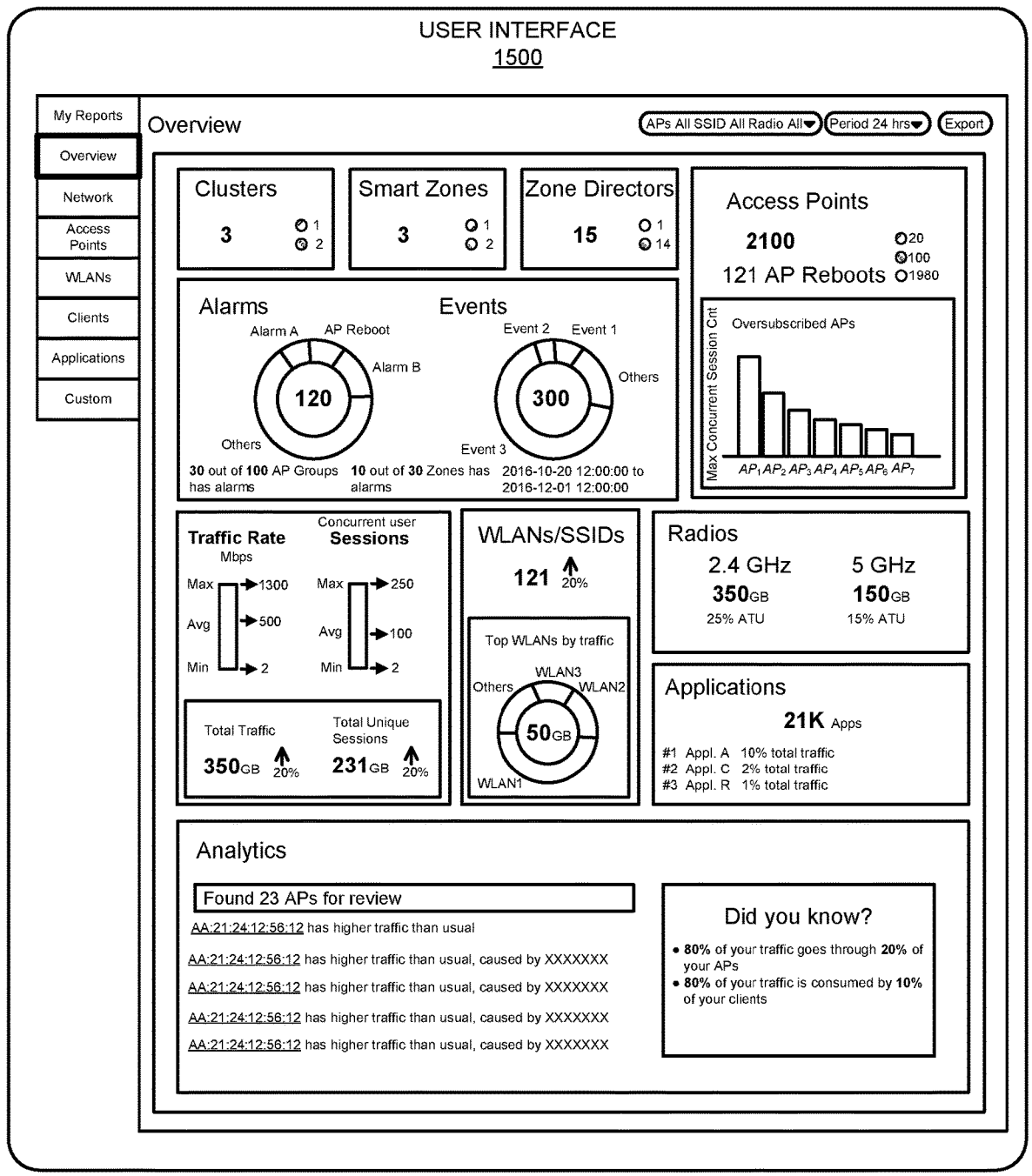
FIG. 15 presents an example of a user interface with information associated with anomaly detection in accordance with an embodiment of the present disclosure.

NV engine 1422 may receive insights from IG engine 1418. Then, NV engine 1422 may generate notifications, recommendations and/or visualization reports of the insights, and may send them to an electronic device associated with a user for display and, more generally, for presentation to or use by the user. For example, FIG. 15 presents an example of a user interface 1500 on a display with information associated with anomaly detection. In particular, user interface 1500 may summarize the operation of a Wi-Fi network, including detected or identified anomalies.

Figure 16:
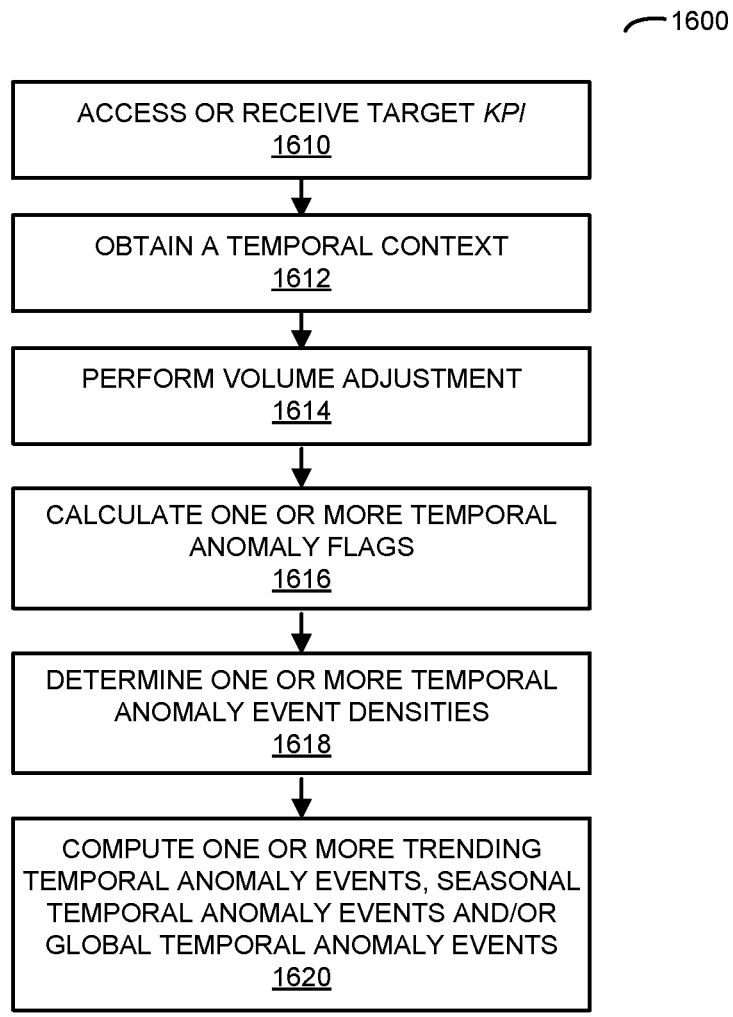
FIG. 16 is a flow chart illustrating an example of a method for temporal anomaly detection using a computer in FIG. 1 in accordance with an embodiment of the present disclosure.

We now describe methods for performing operations in the detection technique. FIG. 16 presents a flow chart illustrating an example of a method 1600 for temporal anomaly detection, which may be performed by a computer (such as PMADS system 1400 in FIG. 14). During method 1600, the computer may access or receive a target KPI sample (operation 1610).

Then, the computer may obtain a temporal context (operation 1612). For example, the seasonal temporal context $STC_{i,t}$ may be obtained by analyzing the underlying seasonality of the target KPI and/or studying a time series of the target KPI samples using techniques such as spectral analysis or time series decomposition. Note that the underlying seasonality of the target KPI may not, in general, be time dependent. Stated differently, the seasonality analysis of the target KPI may not need to be performed for every target KPI sample. Instead, a new seasonality analysis may be performed when significant changes occur in the underlying seasonality.

The seasonal temporal context of a target KPI sample may be determined based at least in part on the position of the target time instant within a seasonal cycle. For example, the target KPI may be the hourly traffic of a given target access point, and a target KPI sample may be collected between 8:00 and 9:00 am on Friday of week x. If the target KPI has a daily seasonality, the corresponding temporal context may be [8:00-9:00 am on Friday of week x, 8:00-9:00 am on Thursday of week x, 8:00-9:00 am on Wednesday of week x, . . . ]. Alternatively, if the target KPI has a weekly seasonality, the corresponding temporal context may be

[8:00-9:00 am on Friday of week x, 8:00-9:00 am on Friday of week (x−1), 8:00-9:00 am on Friday of week (x−2), . . . ]. In either case, the first few time ranges (in reverse chronological order), which may have an aggregated length up to LS, may be used as the temporal context. Note that LS may be a predetermined parameter that depends on the temporal stationarity of the target KPI. In particular, a larger LS may be used to generate a stable temporal benchmark when the target KPI has more erratic temporal fluctuations. For example, LS may be 20 times the period of the target KPI, such as an LS of 20 hours for hourly traffic in the preceding example.

Moreover, as discussed previously, the trending temporal context $TTC_{i,t}$ may be defined based at least in part on a short lookback window from the target time instant. The length of the lookback window may be a predefined parameter denoted as LT. For example, LT may be 20 times of the period of the target KPI, such as an LT of 20 hours for hourly traffic in the preceding example.

The global temporal context $GTC_{i,t}$ may defined based on a long lookback window from the target time instant. The length of the lookback window may be a predefined parameter denoted as LG. For example, LG may be 5000 times of the period of the target KPI, such as an LG of 5000 hours for hourly traffic in the preceding example.

Next, the computer may optionally selectively perform volume adjustment (operation 1614). For example, the computer may perform volume adjustment for one or more ratio-based KPI samples according to Eqns. 1 and 2.

Moreover, the computer may calculate one or more temporal anomaly flags (operation 1616). For example, the computer may calculate a trending, seasonal, and/or global temporal anomaly flag according to Eqns. 3-11.

Furthermore, the computer may selectively determine one or more temporal anomaly event densities (operation 1618). For example, the computer may determine a trending, seasonal, and/or global temporal anomaly event density, as described previously (including Eqns. 19 and 20).

Additionally, the computer may selectively compute one or more trending temporal anomaly events, seasonal temporal anomaly events and/or global temporal anomaly events (operation 1620). For example, the computer may compute a trending temporal anomaly event, a seasonal temporal anomaly event and/or a global temporal anomaly event according to Eqn. 21.

Figure 17:
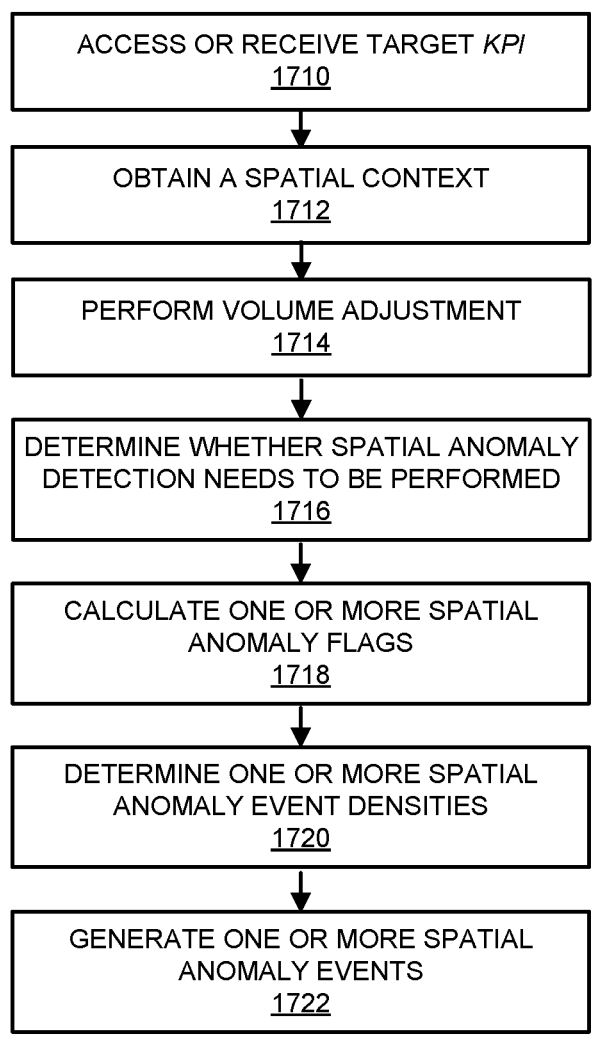
FIG. 17 is a flow chart illustrating an example of a method for spatial anomaly detection using a computer in FIG. 1 in accordance with an embodiment of the present disclosure.

FIG. 17 presents a flow chart illustrating an example of a method 1700 for spatial anomaly detection, which may be performed by a computer (such as PMADS system 1400 in FIG. 14). During method 1600, the computer may access or receive a target KPI sample (operation 1710).

Then, the computer may obtain a spatial context (operation 1712). When the spatial context $SC_{i,t}$ is not provided as a parameter, the spatial context may be determined by clustering the access points in the network based at least in part on their aggregated values of target KPI over the global temporal context. Based on the clustering result, a group of access points that contains the target access point may be used as the spatial context of the target KPI sample. Note that the spatial context may include the group of access points that are deployed in the vicinity of the target access point (the radio-frequency neighbors of the target access point).

Next, the computer may optionally selectively perform volume adjustment (operation 1714). For example, the computer may perform volume adjustment for one or more ratio-based KPI samples according to Eqns. 1 and 2.

Moreover, the computer may determine whether the spatial anomaly detection needs to be performed (operation 1716). For example, the computer may determine whether the spatial anomaly detection is needed according to Eqns. 13 and 14.

Furthermore, the computer may selectively calculate one or more spatial anomaly flags (operation 1718). For example, the computer may calculate a spatial anomaly flag as described previously (including Eqns. 15-18).

Additionally, the computer may selectively determine one or more spatial anomaly event densities (operation 1720). For example, the computer may determine a spatial anomaly event density as described previously (including Eqns. 19 and 20).

Moreover, the computer may selectively generate one or more spatial anomaly events (operation 1722). For example, the computer may generate a spatial anomaly event according to Eqn. 21.

In some embodiments of methods 200 (FIG. 2), 1600 (FIG. 16) and/or 1700, there may be additional or fewer operations. Furthermore, the order of the operations may be changed, and/or two or more operations may be combined into a single operation. Additionally, two or more of the operations may be performed concurrently or in parallel. For example, the temporal anomaly detection and the spatial anomaly detection may be performed in parallel.

Figure 18:
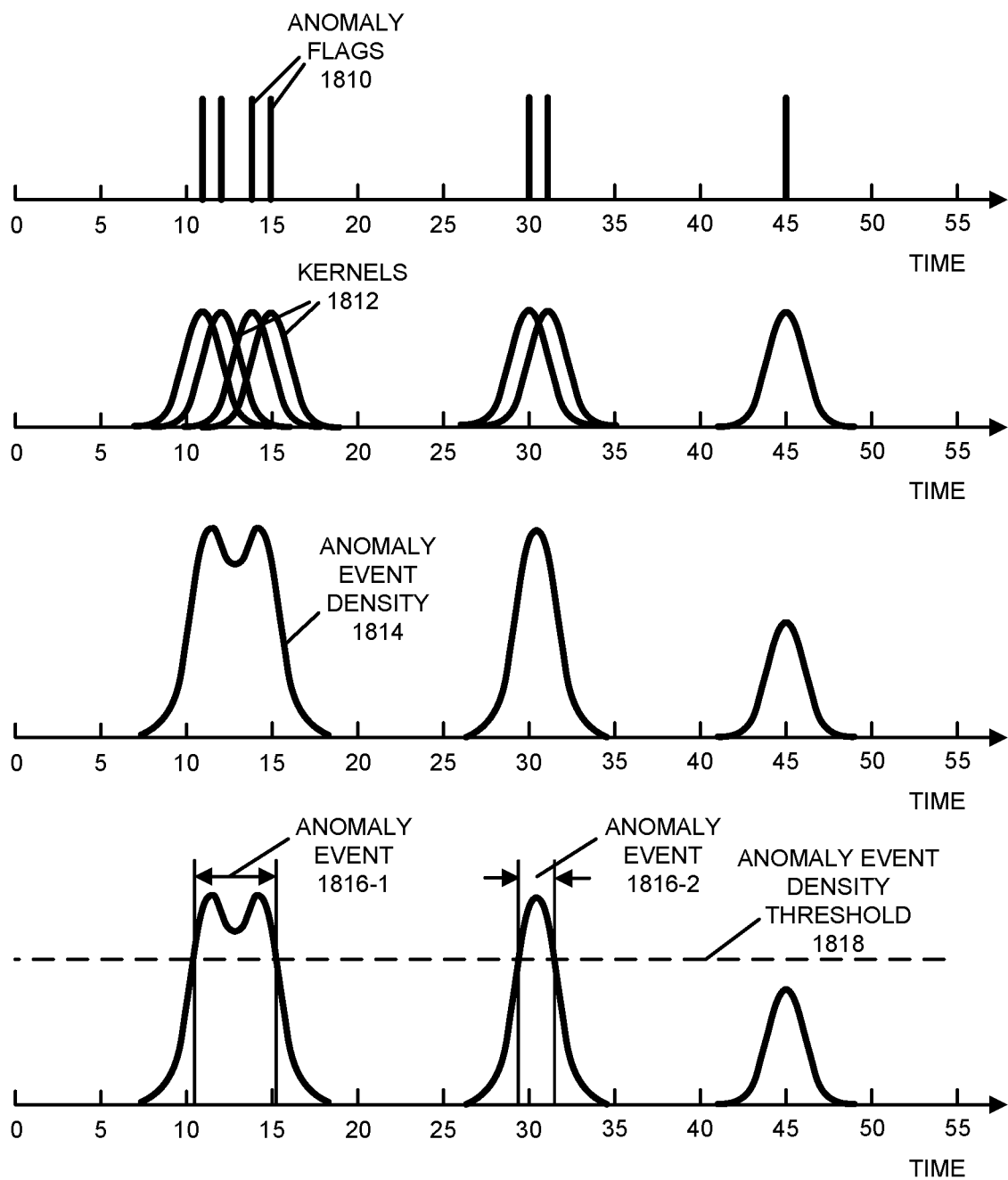
FIG. 18 is a drawing of an example of generation of an anomaly event density using a computer in FIG. 1 in accordance with an embodiment of the present disclosure.

We now describe generation of an anomaly event density. FIG. 18 presents a drawing illustrating of an example of generation of an anomaly event density, which may be performed by a computer (such as PMADS system 1400 in FIG. 14). During operation, the computer may calculate one or more anomaly event flags 1810. For example, the computer may calculate a temporal flag and/or a spatial anomaly flag. Notably, each bar on the timeline may denote a time instant where an anomaly is detected, i.e., the anomaly flag equals true.

Then, the computer may generate kernels 1812 (or may apply a predetermined kernel). In FIG. 18, a kernel (such as a Gaussian kernel) may be generated at each time instant where an anomaly flag is equal to true.

Next, the computer may determine an anomaly event density 1814. For example, the anomaly event density may be calculated by taking the sum of all the kernels at each time instant.

Moreover, the computer may generate one or more anomaly events 1816. For example, one or more anomaly events may be generated by comparing the anomaly event density with the predefined threshold $\eta_6$ (as illustrated by anomaly event density threshold 1818). Note that an anomaly event may be generated over a given continuous period of time within which the anomaly event density is larger than $\eta_6$ for all the time instants.

Figure 19:
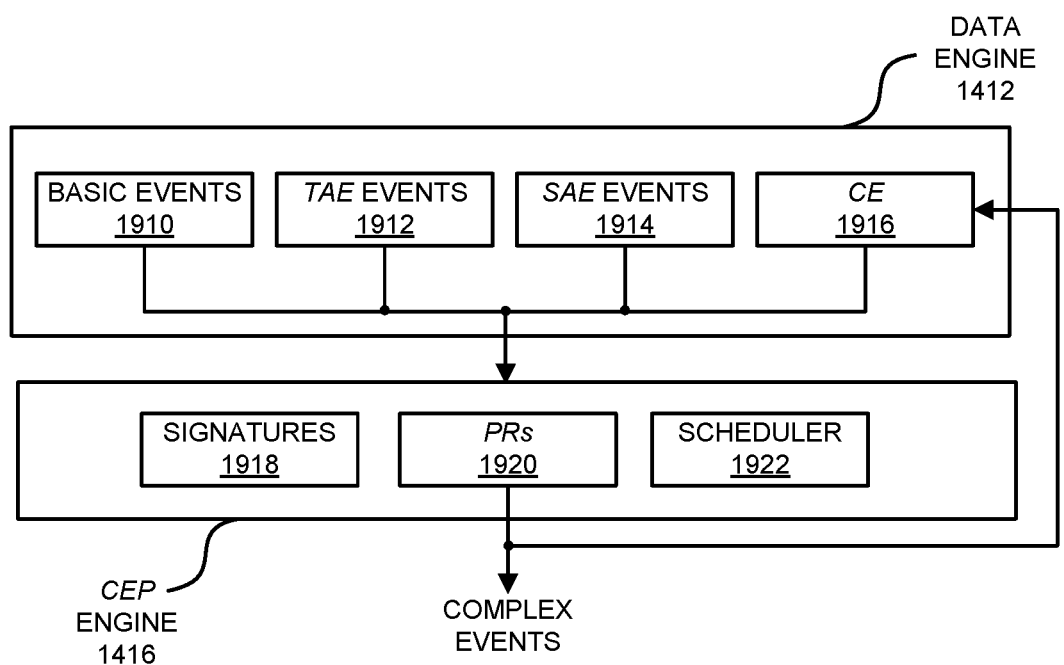
FIG. 19 is a drawing illustrating of an example of complex event processing using a computer in FIG. 1 in accordance with an embodiment of the present disclosure.

We now describe complex event processing. FIG. 19 presents a drawing illustrating of an example of complex event processing, which may be performed by CEP engine 1416 and/or PMADS system 1400 (FIG. 14). Notably, the CEP engine 1416 may access or receive events from data engine 1412. For example, data engine 1412 may store events generated by the system, including: basic events 1910 (generated by the network itself), temporal anomaly events (TAE) 1912 (generated by the temporal anomaly detections), spatial anomaly events (SAE) 1914 (generated by the spatial anomaly detection), and/or complex events (CE) 1916 (generated by previous complex event processing).

Then, CEP engine 1416 may perform complex event processing. For example, CEP engine 1416 may include: predefined or predetermined signatures 1918, pattern recognizers (PRs) 1920, and a scheduler 1922. Signatures 1918 may specify specific patterns of events that are of interest. These patterns may be predefined by the domain experts or they may be obtained or previously determined from the data by applying machine learning or a data mining technique (such as frequent sequence mining). Note that a given pattern recognizer may identify one or more specific patterns of events. This pattern recognizer may monitor the flow of the events and it may generate the corresponding complex event(s) whenever the specific pattern(s) occur.

Moreover, scheduler 1922 may manage and coordinate the functions of pattern recognizers 1920. For example, scheduler 1922 may: activate a pattern recognizer for each pattern of events recorded in signatures 1918; when a specific pattern of events occurs, log the details of the corresponding complex event and execute any pre-defined callback functions; and/or update the status of the pattern recognizer that has just been triggered and reactivate it for capturing recurrences of the same pattern of events. Thus, scheduler 1922 may store identified complex events in data engine 1412 for subsequent use.

Figure 20:
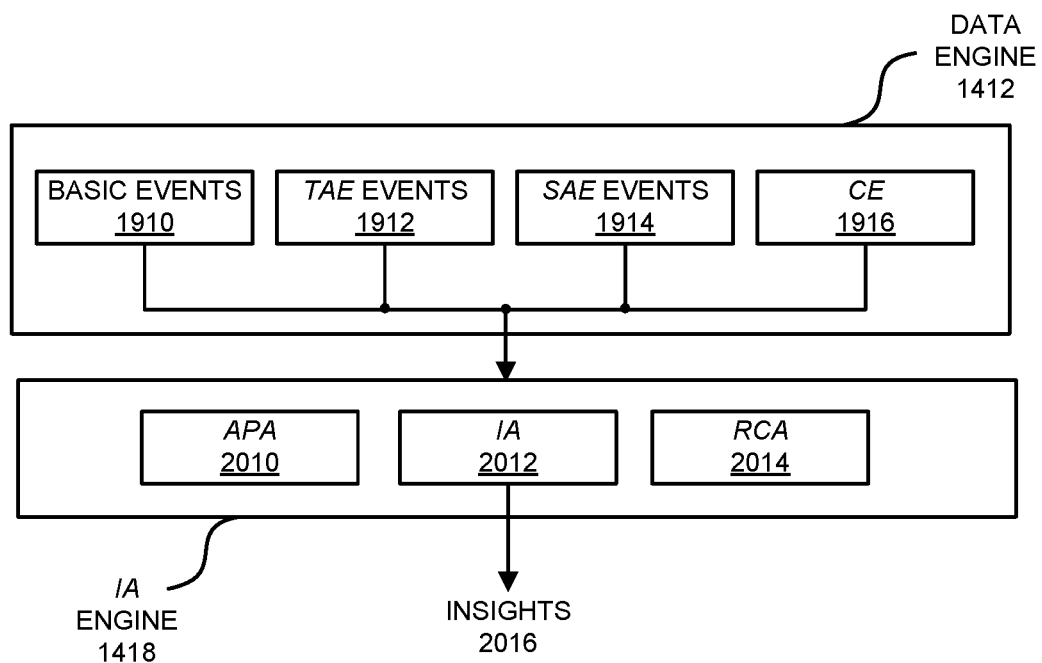
FIG. 20 is a drawing illustrating of an example of insight generation using a computer in FIG. 1 in accordance with an embodiment of the present disclosure.

FIG. 20 presents a drawing illustrating of an example of insight generation, which may be performed by IG engine 1418 and/or PMADS system 1400 (FIG. 14). Notably, IG engine 1418 may access or receive events from data engine 1412. For example, data engine 1412 may store events generated by the system, including: basic events 1910 (generated by the network itself), temporal anomaly events 1912 (generated by the temporal anomaly detections), spatial anomaly events 1914 (generated by the spatial anomaly detection), and/or complex events 1916 (generated by previous complex event processing).

Then, IG engine 1418 may generate insights 2016. For example, the anomalous periods analysis (APA) may 2010 aggregate and analyze the duration and/or distribution of the anomaly events over a given observation window, e.g., 9:00-10:00 am this morning, yesterday, and last month, etc. Moreover, impact analysis (IA) 2012 may use ARL to evaluate the statistical significance of the correlation between a given network issue and different network attributes. Furthermore, root cause analysis (RCA) 2014 may use the output of CEP engine 1416 to identify the most likely cause(s) for a given network issue.

In these ways, the detection technique may provide a generic framework for monitoring and anomaly diagnosis of large-scale networks. Notably, the anomaly detection techniques may consider temporal and/or spatial contexts of the target KPI samples, and therefore may be able to identify the true anomalies that could not be explained by normal system dynamics. Moreover, the detection technique may not require labeled data for training and/or validation. Furthermore, the detection technique may not, in general, need to identify anomalies using fixed thresholds, which may make the identifications robust to variations of environmental factors.

Furthermore, the volume adjustment technique may adjust the values of ratio-based KPI samples by considering the absolute values of both their numerators and denominators, as well as metrics that describe impacts of the specific issue on the network (e.g., client count). The resulting adjusting ratio-based KPI may represent the severity of the issue of interest more accurately and objectively.

Additionally, the anomaly event density technique may use of kernels to calculate the probability of a specific time instant being anomalous. Consequently, time periods where anomalies are repeatedly and frequently detected may stand out and indicate the occurrence of an anomaly event. In contrast, isolated anomalies, which may be caused by a noisy environment, may be ignored, which may reduce the number of false alarms of the system.

Moreover, the complex event processing technique may capture the correlations or statistical associations between the basic events, anomaly events, and/or other complex events by identifying specific patterns among them. A complex event may be able to provide a deeper insight of the status of a network than the individual member events that define it. Therefore, the complex event processing may make accurate and specific anomaly diagnosis possible.

Furthermore, the insight analysis technique may use ARL to evaluate the statistical significance of the correlation or statistical association among a given network issue and different network attributes. This capability may help in narrowing down the location(s) in the scope of the network where the issue of interest originates and/or has the biggest impact(s).

We now describe embodiments of an electronic device, which may perform at least some of the operations in the detection technique. FIG. 21 presents a block diagram illustrating an electronic device 2100 in accordance with some embodiments, such as one of access points 110, one of electronic devices 112 or computer 122. This electronic device includes processing subsystem 2110, memory subsystem 2112, and networking subsystem 2114. Processing subsystem 2110 includes one or more devices configured to perform computational operations. For example, processing subsystem 2110 can include one or more microprocessors, ASICs, microcontrollers, programmable-logic devices, and/or one or more digital signal processors (DSPs).

Memory subsystem 2112 includes one or more devices for storing data and/or instructions for processing subsystem 2110 and networking subsystem 2114. For example, memory subsystem 2112 can include dynamic random access memory (DRAM), static random access memory (SRAM), and/or other types of memory. In some embodiments, instructions for processing subsystem 2110 in memory subsystem 2112 include: one or more program modules or sets of instructions (such as program module 2122 or operating system 2124), which may be executed by processing subsystem 2110. Note that the one or more computer programs may constitute a computer-program mechanism. Moreover, instructions in the various modules in memory subsystem 2112 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 2110.

In addition, memory subsystem 2112 can include mechanisms for controlling access to the memory. In some embodiments, memory subsystem 2112 includes a memory hierarchy that comprises one or more caches coupled to a memory in electronic device 2100. In some of these embodiments, one or more of the caches is located in processing subsystem 2110.

In some embodiments, memory subsystem 2112 is coupled to one or more high-capacity mass-storage devices (not shown). For example, memory subsystem 2112 can be coupled to a magnetic or optical drive, a solid-state drive, or another type of mass-storage device. In these embodiments, memory subsystem 2112 can be used by electronic device 2100 as fast-access storage for often-used data, while the mass-storage device is used to store less frequently used data.

Networking subsystem 2114 includes one or more devices configured to couple to and communicate on a wired and/or wireless network (i.e., to perform network operations), including: control logic 2116, an interface circuit 2118 and one or more antennas 2120 (or antenna elements). (While FIG. 21 includes one or more antennas 2120, in some embodiments electronic device 2100 includes one or more nodes, such as nodes 2108, e.g., a pad, which can be coupled to the one or more antennas 2120. Thus, electronic device 2100 may or may not include the one or more antennas 2120.) For example, networking subsystem 2114 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Note that a transmit or receive antenna pattern (or antenna radiation pattern) of electronic device 2100 may be adapted or changed using pattern shapers (such as reflectors) in one or more antennas 2120 (or antenna elements), which can be independently and selectively electrically coupled to ground to steer the transmit antenna pattern in different directions. Thus, if one or more antennas 2120 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 2100 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 2114 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 2100 may use the mechanisms in networking subsystem 2114 for performing simple wireless communication between the electronic devices, e.g., transmitting advertising or beacon frames and/or scanning for advertising frames transmitted by other electronic devices as described previously.

Within electronic device 2100, processing subsystem 2110, memory subsystem 2112, and networking subsystem 2114 are coupled together using bus 2128. Bus 2128 may include an electrical, optical, and/or electro-optical connection that the subsystems can use to communicate commands and data among one another. Although only one bus 2128 is shown for clarity, different embodiments can include a different number or configuration of electrical, optical, and/or electro-optical connections among the subsystems.

In some embodiments, electronic device 2100 includes a display subsystem 2126 for displaying information on a display, which may include a display driver and the display, such as a liquid-crystal display, a multi-touch touchscreen, etc.

Electronic device 2100 can be (or can be included in) any electronic device with at least one network interface. For example, electronic device 2100 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, an access point, a controller, test equipment, and/or another electronic device.

Although specific components are used to describe electronic device 2100, in alternative embodiments, different components and/or subsystems may be present in electronic device 2100. For example, electronic device 2100 may include one or more additional processing subsystems, memory subsystems, networking subsystems, and/or display subsystems. Additionally, one or more of the subsystems may not be present in electronic device 2100. Moreover, in some embodiments, electronic device 2100 may include one or more additional subsystems that are not shown in FIG. 21. Also, although separate subsystems are shown in FIG. 21, in some embodiments some or all of a given subsystem or component can be integrated into one or more of the other subsystems or component(s) in electronic device 2100. For example, in some embodiments program module 2122 is included in operating system 2124 and/or control logic 2116 is included in interface circuit 2118.

Moreover, the circuits and components in electronic device 2100 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 2114. The integrated circuit may include hardware and/or software mechanisms that are used for transmitting wireless signals from electronic device 2100 and receiving signals at electronic device 2100 from other electronic devices. Aside from the mechanisms herein described, radios are generally known in the art and hence are not described in detail. In general, networking subsystem 2114 and/or the integrated circuit can include any number of radios. Note that the radios in multiple-radio embodiments function in a similar way to the described single-radio embodiments.

In some embodiments, networking subsystem 2114 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used an Ethernet and a Wi-Fi communication protocol as an illustrative example, in other embodiments a wide variety of communication protocols and, more generally, wireless communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 2122, operating system 2124 (such as a driver for interface circuit 2118) or in firmware in interface circuit 2118. Alternatively or additionally, at least some of the operations in the communication technique may be implemented in a physical layer, such as hardware in interface circuit 2118.

In the preceding description, we refer to 'some embodiments'. Note that 'some embodiments' describes a subset of all of the possible embodiments, but does not always specify the same subset of embodiments. Moreover, note that numerical values in the preceding embodiments are illustrative examples of some embodiments. In other embodiments of the communication technique, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer, comprising:
an interface circuit configured to communicate with access points in a network;
a processor coupled to the interface circuit; and
memory, coupled to the processor, which stores program instructions, wherein, when executed by the processor, the program instructions cause the computer to perform operations comprising:
monitoring values of at least one performance metric associated with packet communication associated with the access points;
comparing the values of at least the one performance metric for the access points in multiple temporal contexts with historical values of at least the one performance metric to determine one or more temporal anomalies for one or more of the access points, wherein a given temporal anomaly comprises a deviation that is statistically significant based at least in part on a moment of a distribution of at least the one performance metric and a threshold value;
comparing the values of at least the one performance metric for the access points having a spatial context to determine one or more spatial anomalies for one or more of the access points, wherein a given spatial anomaly comprise a second deviation that is statistically significant based at least in part on a second moment of a second distribution associated with spatial locations of the access points and a second threshold value;
generating one or more temporal anomaly events based at least in part on the one or more temporal anomalies;
generating one or more spatial anomaly events based at least in part on the one or more spatial anomalies;
calculating one or more complex events based at least in part on two or more of the one or more temporal anomalies and the one or more spatial anomalies;
evaluating the one or more temporal anomaly events, the one or more spatial anomaly events, and the one or more complex events to determine one or more insights about a problem in the network; and
performing a remedial action associated with the problem based at least in part on the one or more insights.

2. The computer of claim 1, wherein the spatial context comprises the access points having an environment with one or more common attributes.

3. The computer of claim 1, wherein the multiple temporal contexts comprises one or more instances of a first time interval, a second time interval and a third time interval;
wherein the second time interval includes the first time interval and the third time interval includes the second time interval.

4. The computer of claim 1, wherein the one or more temporal anomalies corresponding to the multiple temporal contexts are determined using different thresholds.

5. The computer of claim 1, wherein the one or more temporal anomalies and the one or more spatial anomalies are determined concurrently.

6. The computer of claim 1, wherein the one or more temporal anomalies are based at least in part on a temporal anomaly direction.

7. The computer of claim 1, wherein, when at least the one performance metric corresponds to a ratio, the operations comprise computing adjusted values of at least the one performance metric based at least in part on the values of at least the one performance metric and the historical values of at least the one performance metric; and wherein the one or more temporal anomalies or the one or more spatial anomalies are determined using the adjusted values instead of the values.

8. The computer of claim 1, wherein the one or more temporal anomaly events correspond to one or more temporal clusters of the one or more temporal anomalies, and the one or more spatial anomaly events correspond to one or more spatial clusters of the one or more spatial anomalies.

9. The computer of claim 1, wherein the one or more temporal anomalies are based at least in part on median absolute deviations of the values.

10. The computer of claim 1, wherein the one or more temporal anomaly events are generated based at least in part on superpositions of instances of a kernel function at the one or more temporal anomalies and a threshold.

11. The computer of claim 1, wherein the one or more insights comprise or correspond to one or more of: analysis in a time window; analysis of different potential problems in the network; or identification of the problem.

12. The computer of claim 1, wherein the remedial action comprises: a recommendation about the problem, a notification about the problem, a report with computed results associated with the problem, or a corrective action in the network associated with the problem.

13. The computer of claim 12, wherein the corrective action comprises: updating firmware, rebooting or providing another type of feedback to at least one of the access points.

14. A non-transitory computer-readable storage medium for use in conjunction with a computer, the computer-readable storage medium storing program instructions, wherein, when executed by the computer, the program instructions cause the computer to perform operations comprising:

monitoring values of at least one performance metric associated with packet communication associated with access points in a network;

comparing the values of at least the one performance metric for the access points in multiple temporal contexts with historical values of at least the one performance metric to determine one or more temporal anomalies for one or more of the access points, wherein a given temporal anomaly comprises a deviation that is statistically significant based at least in part on a moment of a distribution of at least the one performance metric and a threshold value;

comparing the values of at least the one performance metric for the access points having a spatial context to determine one or more spatial anomalies for one or more of the access points, wherein a given spatial anomaly comprise a second deviation that is statistically significant based at least in part on a second moment of a second distribution associated with spatial locations of the access points and a second threshold value;

generating one or more temporal anomaly events based at least in part on the one or more temporal anomalies;

generating one or more spatial anomaly events based at least in part on the one or more spatial anomalies;

calculating one or more complex events based at least in part on two or more of the one or more temporal anomalies and the one or more spatial anomalies;

evaluating the one or more temporal anomaly events, the one or more spatial anomaly events, and the one or more complex events to determine one or more insights about a problem in the network; and performing a remedial action associated with the problem based at least in part on the one or more insights.

15. The non-transitory computer-readable storage medium of claim 14, wherein the spatial context comprises the access points having an environment with one or more common attributes.

16. The non-transitory computer-readable storage medium of claim 14, wherein the one or more temporal anomalies corresponding to the multiple temporal contexts are determined using different thresholds.

17. The non-transitory computer-readable storage medium of claim 14, wherein the one or more temporal anomaly events correspond to one or more temporal clusters of the one or more temporal anomalies, and the one or more spatial anomaly events correspond to one or more spatial clusters of the one or more spatial anomalies.

18. The non-transitory computer-readable storage medium of claim 14, wherein the one or more temporal anomaly events are generated based at least in part on superpositions of instances of a kernel function at the one or more temporal anomalies and a threshold.

19. The non-transitory computer-readable storage medium of claim 14, wherein the one or more insights comprise or correspond to one or more of: analysis in a time window; analysis of different potential problems in the network; or identification of the problem.

20. A method for performing a remedial action, comprising:

monitoring, by a computer, values of at least one performance metric associated with packet communication associated with access points in a network;

comparing, by the computer, the values of at least the one performance metric for the access points in multiple temporal contexts with historical values of at least the one performance metric to determine one or more temporal anomalies for one or more of the access points, wherein a given temporal anomaly comprises a deviation that is statistically significant based at least in part on a moment of a distribution of at least the one performance metric and a threshold value;

comparing, by the computer, the values of at least the one performance metric for the access points having a spatial context to determine one or more spatial anomalies for one or more of the access points, wherein a given spatial anomaly comprise a second deviation that is statistically significant based at least in part on a second moment of a second distribution associated with spatial locations of the access points and a second threshold value;

generating, by the computer, one or more temporal anomaly events based at least in part on the one or more temporal anomalies;

generating, by the computer, one or more spatial anomaly events based at least in part on the one or more spatial anomalies;

calculating, by the computer, one or more complex events based at least in part on two or more of the one or more temporal anomalies and the one or more spatial anomalies;

evaluating, by the computer, the one or more temporal anomaly events, the one or more spatial anomaly events, and the one or more complex events to determine one or more insights about a problem in the network; and performing, by the computer, the remedial action associated with the problem based at least in part on the one or more insights.

\* \* \* \* \*